US012410933B2

(12) United States Patent
Chae et al.

(10) Patent No.: US 12,410,933 B2
(45) Date of Patent: Sep. 9, 2025

(54) AIR CONDITIONER AND METHOD FOR OPERATING AN AIR CONDITIONER BASED ON USER ACTIVITY

(71) Applicant: LG ELECTRONICS INC., Seoul (KR)

(72) Inventors: Yeonkyung Chae, Seoul (KR); Sungyong Kim, Seoul (KR); Dongwoo Han, Seoul (KR); Taeyup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 17/869,971

(22) Filed: Jul. 21, 2022

(65) Prior Publication Data

US 2023/0035576 A1 Feb. 2, 2023

(30) Foreign Application Priority Data

Jul. 22, 2021 (KR) .......................... 10-2021-0096539

(51) Int. Cl.
*F24F 11/63* (2018.01)
*F24F 11/77* (2018.01)
(Continued)

(52) U.S. Cl.
CPC .............. *F24F 11/63* (2018.01); *F24F 11/77* (2018.01); *F24F 11/79* (2018.01); *F24F 13/10* (2013.01);
(Continued)

(58) Field of Classification Search
CPC ........ F24F 11/30; F24F 11/64; F24F 2120/12; F24F 11/79; F24F 2120/10; F24F 11/65;
(Continued)

(56) References Cited

U.S. PATENT DOCUMENTS 10,371,399 B1* 8/2019 Rodriguez ............ F24F 3/0442
2005/0279118 A1* 12/2005 Son ........................ F24F 1/0011
62/428

(Continued)

FOREIGN PATENT DOCUMENTS

JP 06-323599 11/1994
JP 2010-121797 6/2010

(Continued)

OTHER PUBLICATIONS

Japanese Office Action issued in Application No. 2022-115689 dated Jul. 11, 2023.

(Continued)

*Primary Examiner* — Darrin D Dunn
(74) *Attorney, Agent, or Firm* — KED & ASSOCIATES, LLP

(57) ABSTRACT

An air conditioner and a method for operating an air conditioner are provided. The air conditioner may include a case having a space formed therein and an open bottom; a panel disposed under the case and having an inlet and a plurality of outlets disposed around a circumference of the inlet; a fan disposed in the case and configured to generate an airflow from the inlet to the plurality of outlets; an airflow direction controller disposed at the plurality of outlets and configured to control an airflow direction of air flowing through the plurality of outlets in a plurality of directions; a camera disposed at one side of the panel and directed toward an indoor space; and a controller configured to control the airflow direction controller based on images corresponding to the indoor space and captured by the camera. The controller may be configured to determine an activity level of an occupant for each of a plurality of areas of the indoor space based on a plurality of images corresponding to the indoor space; determine a direction of air discharged from the plurality of outlets based on the determined activity level;

(Continued)

and control the airflow direction controller according to the direction of the air which is determined for the plurality of outlets.

18 Claims, 24 Drawing Sheets

(51) Int. Cl.
*F24F 11/79* (2018.01)
*F24F 13/10* (2006.01)
*G05B 19/042* (2006.01)
*F24F 110/10* (2018.01)
*F24F 120/14* (2018.01)

(52) U.S. Cl.
CPC ........ *G05B 19/042* (2013.01); *F24F 2110/10* (2018.01); *F24F 2120/14* (2018.01); *F24F 2221/14* (2013.01); *G05B 2219/2614* (2013.01)

(58) Field of Classification Search
CPC ........ F24F 2120/14; F24F 11/62; F24F 11/63; F24F 2221/38; F24F 13/10; F24F 1/0014; F24F 1/0047; F24F 13/06; F24F 2140/40; G05B 15/02; G05B 15/00; G05B 2219/2614; G05B 19/042; G06V 20/52; G06V 20/40; G06V 20/44; G06V 40/10; G06V 40/20; G06V 40/103
See application file for complete search history.

(56) References Cited

U.S. PATENT DOCUMENTS

| | | | | |
|---|---|---|---|---|
| 2017/0039729 | A1* | 2/2017 | Wang | G06T 7/254 |
| 2018/0209681 | A1* | 7/2018 | Song | F24F 11/77 |
| 2019/0309978 | A1* | 10/2019 | Song | F24F 11/58 |
| 2019/0353386 | A1* | 11/2019 | Lee | F24F 11/79 |
| 2019/0368773 | A1* | 12/2019 | Lee | F24F 13/10 |
| 2021/0088244 | A1* | 3/2021 | Kim | F24F 11/79 |
| 2021/0215373 | A1* | 7/2021 | Han | F24F 11/79 |
| 2021/0247095 | A1* | 8/2021 | Lee | F24F 11/79 |
| 2022/0083782 | A1* | 3/2022 | Qian | G06V 20/41 |
| 2022/0201900 | A1* | 6/2022 | Ma | H05K 7/20736 |
| 2022/0230474 | A1* | 7/2022 | Hasedzic | G06V 20/60 |
| 2023/0066057 | A1* | 3/2023 | Fan | F24F 11/62 |
| 2023/0375207 | A1* | 11/2023 | Klein | F24F 11/65 |

FOREIGN PATENT DOCUMENTS

| | | |
|---|---|---|
| JP | 2011-174648 | 9/2011 |
| JP | 2011-185591 | 9/2011 |
| JP | 2013-253717 | 12/2013 |
| JP | 2015-137836 | 7/2015 |
| JP | 2016-200311 | 12/2016 |
| JP | 2018-514743 | 6/2018 |
| JP | 2021-048797 | 4/2021 |
| KR | 10-2012-0025955 | 3/2012 |
| KR | 10-1333661 | 11/2013 |

OTHER PUBLICATIONS

European Search Report dated Dec. 6, 2022 issued in Application No. 22186432.5.

* cited by examiner

<1110>

<1120>

<1130>

AIR CONDITIONER AND METHOD FOR OPERATING AN AIR CONDITIONER BASED ON USER ACTIVITY

CROSS-REFERENCE TO RELATED APPLICATION(S)

This application claims priority under 35 U.S.C. § 119 to Korean Application No. 10-2021-0096539, filed in Korea on Jul. 22, 2021, whose entire disclosure is hereby incorporated by reference.

BACKGROUND

1. Field

An air conditioner and a method for operating an air conditioner are disclosed herein.

2. Background

An air conditioner is a device for supplying cooled/heated air into a room to control an indoor temperature and to purify indoor air, thereby providing a comfortable indoor environment. Generally, the air conditioner includes an indoor unit including a heat exchanger and installed in an indoor space, and an outdoor unit including a compressor, and a heat exchanger, for example, and supplying refrigerant to the indoor unit.

The air conditioner operates in a cooling mode or in a heating mode depending on a flow of refrigerant. During the cooling operation, high-temperature and high-pressure liquid refrigerant is supplied from the compressor of the outdoor unit by passing through the heat exchanger of the outdoor unit into the indoor unit, and the refrigerant is expanded and vaporized in the heat exchanger of the indoor unit such that an ambient air temperature decreases, and as an indoor unit fan is rotated, cooled air is discharged into the indoor space. During the heating operation, high-temperature and high-pressure liquid refrigerant is supplied from the compressor of the outdoor unit into the indoor unit, and air is heated by energy which is released as the high-temperature and high-pressure liquid refrigerant is liquefied in the heat exchanger of the indoor unit, and the heated air is discharged to the indoor space by the rotation of the indoor unit fan.

As for an existing air conditioner, a user may adjust a direction of air by operating an airflow direction control means of the air conditioner directly with a hand or using a remote control device. However, it can be very uncomfortable for the user to manually operate the airflow direction control means, and if the user is located away from the air conditioner or is unable to locate a position of the remote control device or loses the remote control device, the user may not manually operate the airflow direction control means in some cases. Accordingly, various studies have been conducted to provide an optimal airflow for users even without requiring them to manually operate the airflow direction control means.

Korean Laid-open Patent Publication No. 10-2012-0025955 (related art 1), which is hereby incorporated by reference, discloses a method of sensing an occupant's movement using an infrared sensor, determining an activity level of the occupant according to a type of sound detected by a microphone, and controlling an indoor temperature based on the occupant's activity level. In addition, Korean Patent No. 10-1333661 (related art 2), which is hereby incorporated by reference, discloses a method of determining a moving distance of an occupant present in a space using an image captured by a camera provided in an indoor unit, and controlling indoor temperature based on an activity level corresponding to the moving distance.

However, when the microphone is used, sounds may be generated inside of and outside of the space at the same time, such that various sounds may be input to the microphone. Accordingly, the method disclosed in related art 1 has a problem in that the accuracy in determining various sounds simultaneously input to the microphone is significantly reduced, such that the method may not accurately determine an activity level of an occupant.

Further, an activity level of an occupant doing intense exercise at a fixed position is generally greater than an activity level when the occupant simply moves. However, the method disclosed in related art 2 may determine that the activity level when the occupant simply moves is greater because a moving distance is longer, such that it is difficult to provide an air-conditioned environment that is optimized for the actual activity level of the occupant.

BRIEF DESCRIPTION OF THE DRAWINGS

Embodiments will be described in detail with reference to the following drawings in which like reference numerals refer to like elements, and wherein.

DETAILED DESCRIPTION

Figure 1:
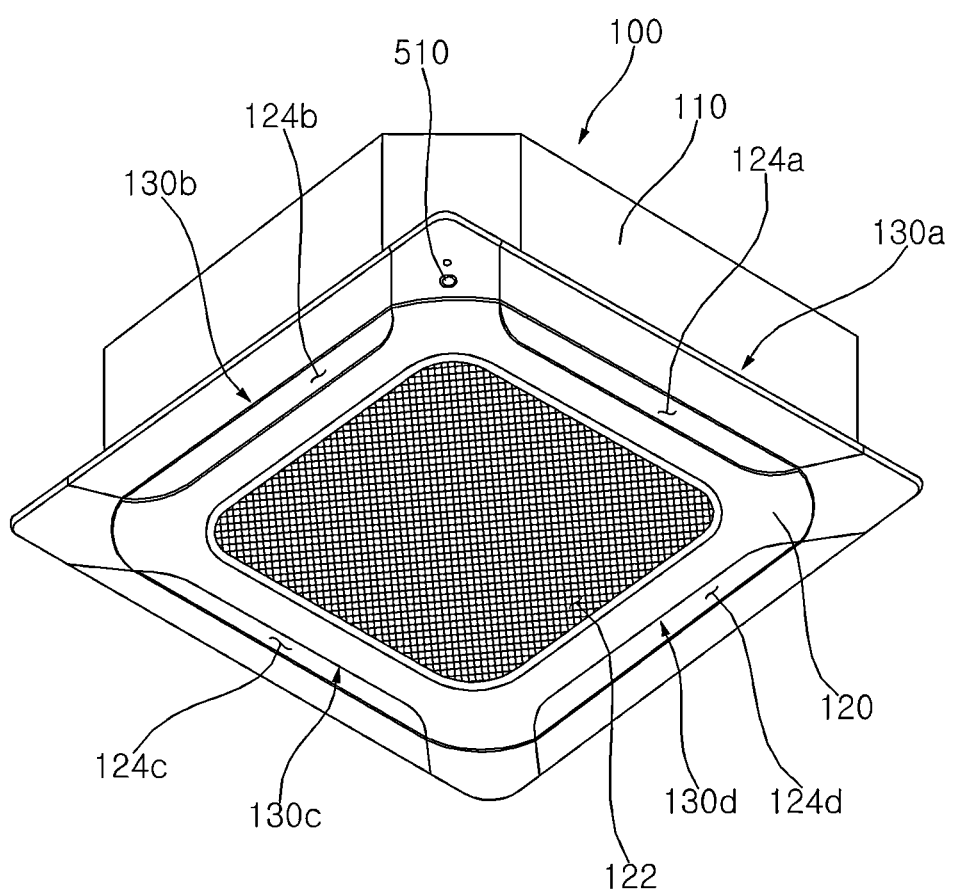
FIG. 1 is a perspective view of an air conditioner according to an embodiment.

Hereinafter, embodiments will be described in detail with reference to the accompanying drawings. In order to clearly and briefly describe embodiments, components that are irrelevant to the description will be omitted in the drawings. The same reference numerals are used throughout the drawings to designate the same or similar components, and a redundant description thereof will be omitted.

Terms "module" and "unit" for elements used in the following description are given simply in view of the ease of the description, and do not carry any important meaning or role. Therefore, the terms "module" and "unit" may be used interchangeably.

It should be understood that the terms, "comprise", 'include", "have", etc. when used in this specification, specify the presence of stated features, integers, steps, operations, elements, components, or combinations thereof but do not preclude the presence or addition of one or more other features, integers, steps, operations, elements, components, or combinations thereof.

It will be understood that, although the terms first, second, etc., may be used herein to describe various elements, these elements should not be limited by these terms. These terms are only used to distinguish one element from another.

Hereinafter, embodiments will be described with reference to the accompanying drawings.

Referring to FIGS. 1 to 4C, an air conditioner 100 according to an embodiment will be described hereinafter. The air conditioner 100 may be, for example, a ceiling mounted air conditioner 100.

Figure 2:
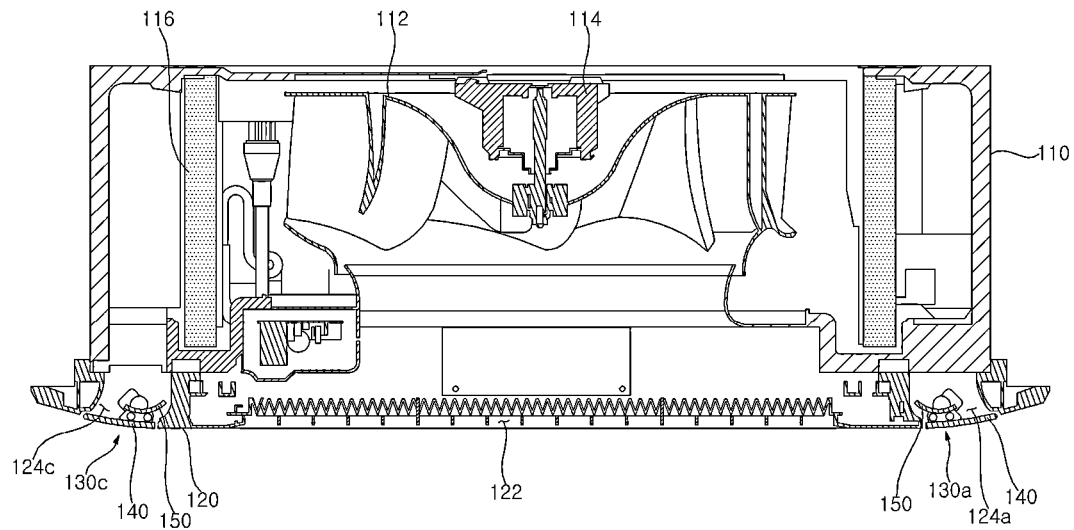
FIG. 2 is a cross-sectional view of one side of the air conditioner according to the embodiment of FIG. 1.

Referring to FIG. 1, the air conditioner 100 may include an inlet 122 which opens downwardly, and an outlet 124 which is disposed around the inlet 122 and opens downwardly. Referring to FIG. 2, the air conditioner 100 may include a case 110 having a space formed therein and an open bottom; a panel 120 disposed under the case 110 and having the inlet 122 and the outlet 124 formed therein; a fan 112 disposed in the case 110; a fan motor 114 that rotates the fan 112; a heat exchanger 116 that performs heat exchange with air blown by the fan 112; and an airflow direction control unit (airflow direction controller) 130 disposed at the outlet 124 and configured to control an airflow direction of flowing air.

Referring to FIG. 1, the outlet 124 may include a plurality of outlets 124a, 124b, 124c, and 124d formed in the panel 120 and spaced apart from each other in different directions around the circumference of the inlet 123. The outlet 124 may include first outlet 124a, second outlet 124b, third outlet 124c, and fourth outlet 124d. The first outlet 124a, the second outlet 124b, the third outlet 124c, and the fourth outlet 124d may be sequentially adjacent to each other and may be perpendicular to each other with respect to the inlet 122. The airflow direction control unit 130 may include first airflow direction control unit 130a, second airflow direction control unit 130b, third airflow direction control unit 130c, and fourth airflow direction control unit 130d disposed at the first outlet 124a, the second outlet 124b, the third outlet 124c, and the fourth outlet 124d, respectively.

The configuration and description of one outlet 124 and airflow direction control unit 130 disposed therein, which will be described hereinafter, may also be applied to the other outlets and airflow direction control units disposed therein, and thus are designated by the common reference numerals.

Figure 3:
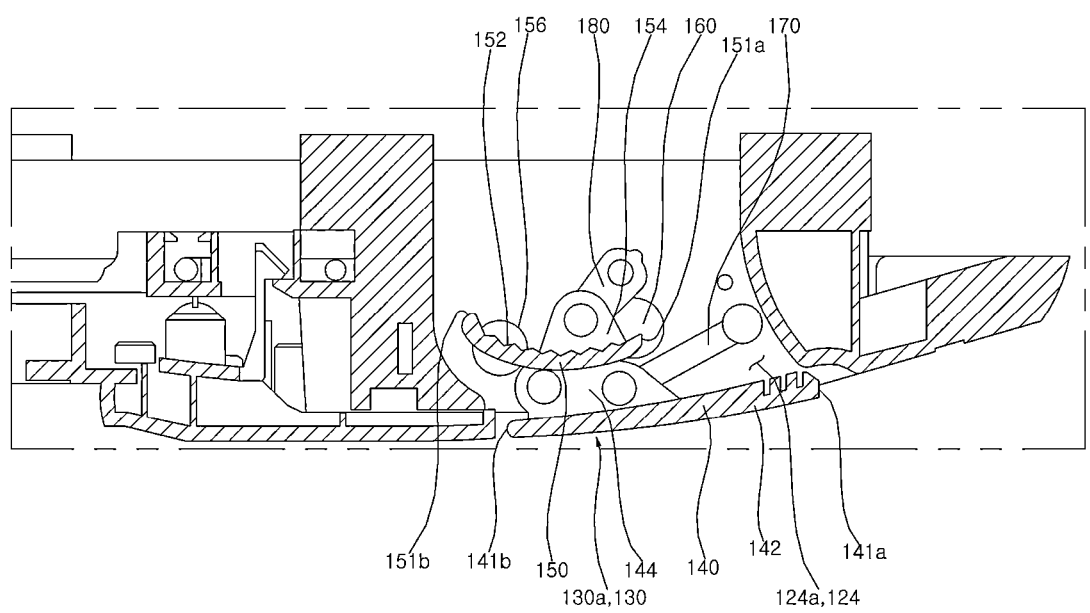
FIG. 3 is a diagram explaining an outlet and an airflow direction control unit of the air conditioner according to the embodiment of FIG. 1.

Referring to FIG. 3, the airflow direction control unit 130 may include a first vane 140 coupled to two links 160 and 170, and a second vane 150 coupled to one of the links coupled to the first vane 140 and having one side rotatably coupled to the panel 120. The first vane 140 and the second vane 150, which are disposed in each of the first outlet 124a, the second outlet 124b, the third outlet 124c, and the fourth outlet 124d, may be disposed at different positions.

The first vane 140 may cover the outlet 124 or may be disposed under the outlet 124. The first vane 140 may be formed longer than the second vane 150.

Referring to FIG. 3, while the fan 112 is in a stopped state in which the fan is not in operation, the first vane 140 may be disposed below the second vane 150. The first vane 140 may include a first vane plate 142 that guides an airflow direction of flowing air, and a first link plate 144 that protrudes forwardly from both ends of left and right or lateral sides of the first vane plate 142 and coupled to the plurality of links 160 and 170.

The second vane 150 may include a second vane plate 152, a second link plate 154 that protrudes forwardly from both ends of the left and right sides of the second vane plate 152 and coupled to a third link 180, and a connector 156 disposed in a left-right or lateral direction of the second vane plate 152 and coupled to the panel 120. The second vane plate 152 may have a curved shape. However, in another example, the second vane plate 152 may have a flat shape.

Referring to FIG. 3, the airflow direction control unit 130 may include the first link 160 rotatably coupled to the panel 120 and the first vane 140, and the second link 170 spaced apart from the first link 160 and rotatably coupled to the panel 120 and the first vane 140. Referring to FIG. 3, the airflow direction control unit 130 may include the third link 180 rotatably coupled to one end of the first link 160 and the second vane 150.

The first link 160 may be rotatably coupled to the first vane 140 and the second vane 150. The first link 160 may be coupled to a vane motor (not shown) to be rotated thereby. The first link 160 may include a panel connector 162 rotatably coupled to the panel 120; a first link bar 164 that extends toward the first vane 140 and having an end rotatably coupled to the first vane 140; and a second link bar 166 that extends from the panel connector 162 toward the second vane 150 and having an end rotatably coupled to the second vane 150.

Figure 4A:
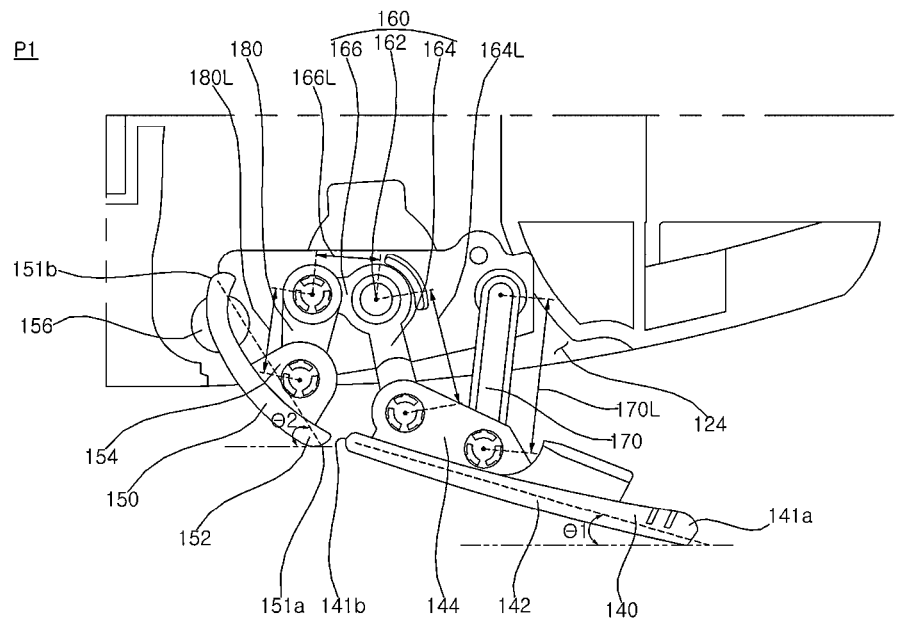
FIGS. 4A to 4C are diagrams explaining an arrangement at each position of the airflow direction control unit according to the embodiment of FIG. 1.

Referring to FIG. 4A, a length 164L of the first link bar 164 may be formed longer than a length 166L of the second link bar 166. The length 164L of the first link bar 164 may be formed shorter than a length 170L of the second link 170. The length 164L of the first link bar 164 may be formed longer than a length 180L of the third link 180. The first link 160 may be disposed closer to the inlet 122 than the second link 170.

An arrangement of the first vane 140 may be changed by the first link 160 and the second link 170. As the arrangement of the first vane 140 is changed by the first link 160 and the second link 170, the first vane 140 may be spaced apart downwardly from the outlet 124. The first vane 140 may be elevated downwardly, and then an inclination thereof may be changed in a direction perpendicular to a ground. A first end 151a of the second vane 150 may be moved downwardly, and then the first end 151a may be moved inwardly and outwardly according to the arrangement of the third link 180.

Referring to FIG. 3, in the following description of the first vane 140 and the second vane 150, ends of each of the first vane 140 and the second vane 150, which are disposed far away from the inlet 122, are defined as first ends 141a and 151a, respectively, and ends of each of the first vane 140 and the second vane 150, which are disposed adjacent to the inlet 122, are defined as second ends 141b and 151b, respectively. The second vane 150 may be rotatably coupled to the panel 120 at a position inwardly from the first vane 140. A direction adjacent to the inlet 122 may be set as an inward direction, and a direction further away from the inlet 122 may be set as an outward direction.

Figure 4B:
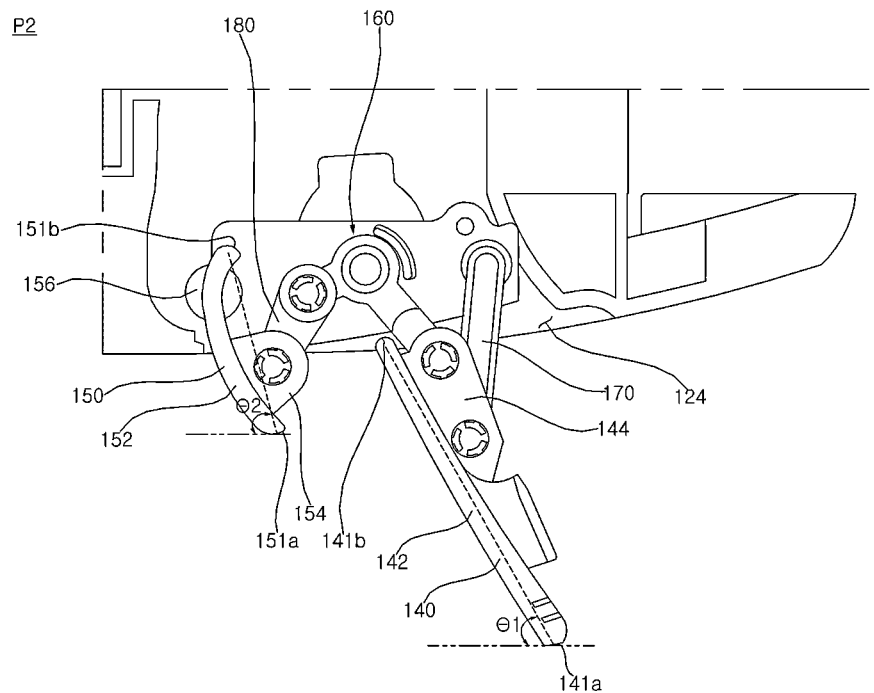
Figure 4C:
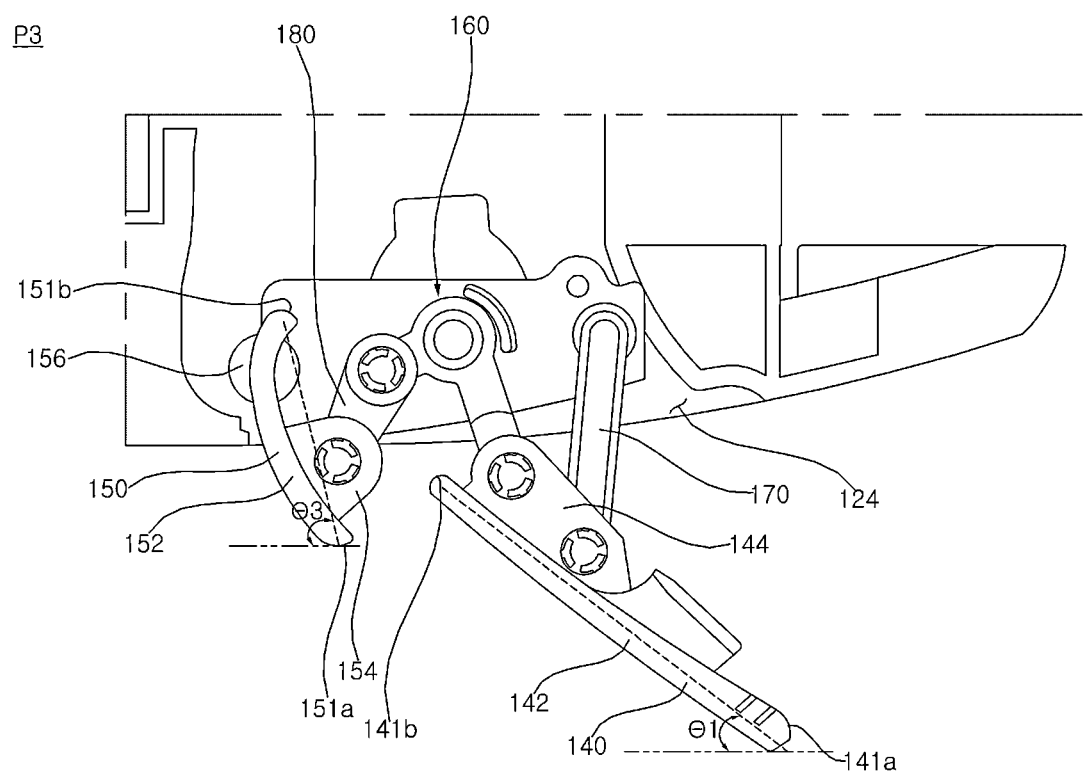

Referring to FIGS. 4A to 4C, the airflow direction control unit 130 may adjust an airflow direction of air discharged through the outlet 124 according to the arrangement. Referring to FIG. 4A, the airflow direction control unit 130 may be disposed in a first position P1 in which the air discharged through the outlet 124 flows in a direction horizontal to the ground. Referring to FIG. 4A, when the airflow direction control unit 130 is disposed in the first position P1, the first vane 140 may be disposed approximately horizontal to the ground. Referring to FIG. 4A, when the airflow direction control unit 130 is disposed in the first position P1, the first vane 140 may form a first inclination angle θ1 of 30 degrees or less with respect to a virtual horizontal line parallel to the ground. The first inclination angle θ1 is formed between the first vane 140 and the virtual horizontal line which is parallel to the ground, and may vary depending on the arrangement of the first vane 140.

Referring to FIG. 4A, when the airflow direction control unit 130 is disposed in the first position P1, the second end 141b of the first vane 140 may be disposed adjacent to the first end 151a of the second vane 150. The second end 141b of the first vane 140 may be directed toward the first end 151a of the second vane 150.

Referring to FIG. 4A, when the airflow direction control unit 130 is disposed in the first position P1, the first inclination angle θ1, formed between the first vane 140 and the virtual horizontal line, may be smaller than a second inclination angle θ2 between a virtual line, connecting the first end 141a and the second end 151b of the second vane 150, and the virtual horizontal line (or a "second inclination angle between the second vane and the virtual horizontal line"). The second inclination angle θ2 is formed between the virtual line, connecting the first end 151a and the second end 151b of the second vane 150, and the virtual horizontal line, and may vary depending on the arrangement of the second vane 150.

Accordingly, air flowing downwardly through the outlet 124 may sequentially flow along the second vane 150 and the first vane 140. Referring to FIG. 4A, when the airflow direction control unit 130 is disposed in the first position P1, the air discharged through the outlet 124 may flow in a direction horizontal to the ground.

Referring to FIG. 4B, the first vane 140 and the second vane 150 may be disposed in a second position P2 in which the air discharged through the outlet 124 flows in a direction perpendicular to the ground. Referring to FIG. 4B, when the airflow direction control unit 130 is disposed in the second position P2, the first vane 140 may be disposed approximately perpendicular to the ground. Referring to FIG. 4B, when the airflow direction control unit 130 is disposed in the second position P2, the first vane 140 may form a first inclination angle θ1 of 60 degrees or more with respect to the virtual horizontal line parallel to the ground.

Referring to FIG. 4B, when the airflow direction control unit 130 is disposed in the second position P2, the second end 141b of the first vane 140 may be spaced apart from the first end 151a of the second vane 150. Referring to FIG. 4B, when the airflow direction control unit 130 is disposed in the second position P2, the second end 141b of the first vane 140 may be disposed above the first end 151a of the second vane 150.

Referring to FIG. 4B, when the airflow direction control unit 130 is disposed in the second position P2, the second end 141b of the first vane 140 may be directed above the second end 151b of the second vane 150. Referring to FIG. 4B, when the airflow direction control unit 130 is disposed in the second position P2, the first vane 140 and the second vane 150 may be disposed approximately parallel to each other.

Referring to FIG. 4B, when the airflow direction control unit 130 is disposed in the second position P2, the first inclination angle θ1, formed between the first vane 140 and the virtual horizontal line, may be similar to the second inclination angle θ2 formed between the second vane 150 and the virtual horizontal line. Referring to FIG. 4B, when the airflow direction control unit 130 is disposed in the second position P2, the air discharged through the outlet 124 may flow in a direction perpendicular to the ground.

Referring to FIG. 4C, the first vane 140 and the second vane 150 may be disposed in a third position P3 in which the air discharged through the outlet 124 flows in a direction diagonal to the ground. When the airflow direction control unit 130 is disposed in the third position P3, the air discharged by passing through the first vane 140 and the second vane 150 may form a diagonal airflow which is directed downwardly below a horizontal airflow in the first position P1 and is directed upwardly above a vertical airflow in the second position P2.

Referring to FIG. 4C, when the airflow direction control unit 130 is disposed in the third position P3, the first vane 140 may be disposed at an inclination angle between the first vane 140 when the airflow direction control unit 130 is disposed in the first position P1, and the first vane 140 when the airflow direction control unit 130 is disposed in the second position P2. Referring to FIG. 4C, when the airflow direction control unit 130 is disposed in the third position P3, the first vane 140 may form a first inclination angle 61, ranging from 30 degrees to 60 degrees, with respect to the virtual horizontal line parallel to the ground.

When the airflow direction control unit 130 is disposed in the third position P3, a separated distance between the second end 141b of the first vane 140 and the first end 151a of the second vane 150 may be longer than a separated distance between the second end 141b of the first vane 140 and the first end 151a of the second vane 150 when the airflow direction control unit 130 is disposed in the first position. When the airflow direction control unit 130 is disposed in the third position P3, a separated distance between the second end 141b of the first vane 140 and the first end 151a of the second vane 150 may be shorter than a separated distance between the second end 141b of the first vane 140 and the first end 151a of the second vane 150 when the airflow direction control unit 130 is disposed in the second position P2.

When the airflow direction control unit 130 is disposed in the first position P1, a horizontal airflow may be generated so that the air discharged through the outlet may flow in a direction horizontal to the ground. When the airflow direction control unit 130 is disposed in the second position P2, a vertical airflow may be generated so that the air discharged through the outlet may flow in a direction perpendicular to the ground. When the airflow direction control unit 130 is disposed in the third position P3, a diagonal airflow may be generated so that the air discharged through the outlet may flow in a direction between an indirect airflow and the vertical airflow. The horizontal airflow and the indirect airflow may be used interchangeably, or the vertical airflow and direct airflow may be used interchangeably.

Figure 5A:
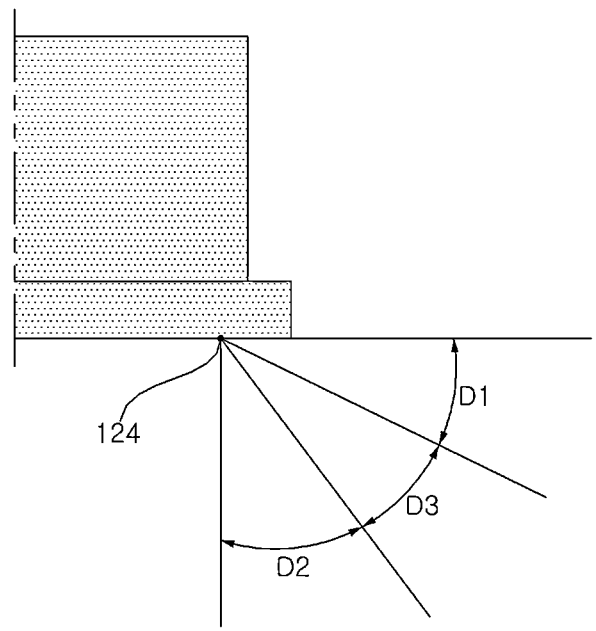
FIGS. 5A and 5B are diagrams explaining an airflow range according to an arrangement of an airflow direction control unit in a heating mode and in a cooling mode of an air conditioner according to an embodiment.
Figure 5B:
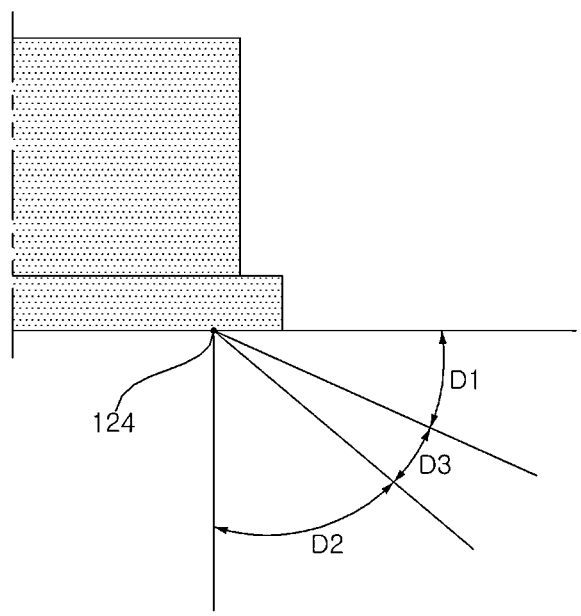

Referring to FIGS. 5A and 5B, the air discharged through the outlet 124 may be divided into three directions by the airflow direction control unit 130. When the airflow direction control unit 130 is disposed in the first position P1, the air discharged through the outlet 124 may flow in a lateral direction. When the airflow direction control unit 130 is disposed in the second position P2, the air discharged through the outlet 124 may flow in a downward direction. When the airflow direction control unit 130 is disposed in the third position P3, the air discharged through the outlet 124 may flow in an intermediate direction between the lateral direction and the downward direction.

In a vertical airflow range according to the first position P1, the second position P2, and the third position P3 of the airflow direction control unit 130, an airflow when the airflow direction control unit 130 is in the third position P3 may be generated below an airflow generated when the airflow direction control unit 130 is in the first position P1 and may be generated above an airflow generated when the airflow direction control unit 130 is in the second position P2.

Under cooling and heating conditions, the vertical airflow range may vary according to the first position P1, the second position P2, and the third position P3 of the airflow direction control unit 130. Referring to FIGS. 5A and 5B, when the airflow direction control unit 130 is disposed in the first position P1, the air discharged through the outlet 124 may flow in a first direction D1. The first direction D1 may refer to a direction in which an angle formed between a main flow direction of the air discharged through the outlet 124 and the ground is in a range of zero degrees to 30 degrees. In the first direction D1, the angle may be formed in a same range under both the heating and cooling conditions.

Referring to FIGS. 5A and 5B, when the airflow direction control unit 130 is disposed in the second position P2, the air discharged through the outlet 124 may flow in a second direction D2. In the second direction D2, the angle may be formed in different ranges under the heating and cooling conditions. Referring to FIG. 5A, under the heating condition, the second direction D2 may refer to a direction in which the angle formed between the main flow direction of the air discharged through the outlet 124 and the ground is in a range of 60 degrees to 90 degrees. Referring to FIG. 5B, under the cooling condition, the second direction D2 may refer to a direction in which the angle formed between the main flow direction of the air discharged through the outlet 124 and the ground is in a range of 45 degrees to 90 degrees.

Referring to FIGS. 5A and 5B, when the airflow direction control unit 130 is disposed in the third position P3, the air discharged through the outlet 124 may flow in a third direction D3. In the third direction D3, the angle may be formed in different ranges under the heating and cooling conditions. Referring to FIG. 5A, under the heating condition, the third direction D3 may refer to a direction in which the angle formed between the main flow direction of the air discharged through the outlet 124 and the ground is in a range of 30 degrees to 60 degrees. Referring to FIG. 5B, under the cooling condition, the third direction D3 may refer to a direction in which the angle formed between the main flow direction of the air discharged through the outlet 124 and the ground is in a range of 45 degrees to 60 degrees.

The ranges of the angle in the first direction D1, the second direction D2, and the third direction D3 are merely examples, and may vary according to a space in which the air conditioner is disposed or a structure of the air conditioner. Further, while FIGS. 5A and 5B illustrate the airflow is divided into three sections, the airflow may also be subdivided into four to six sections.

Figure 6:
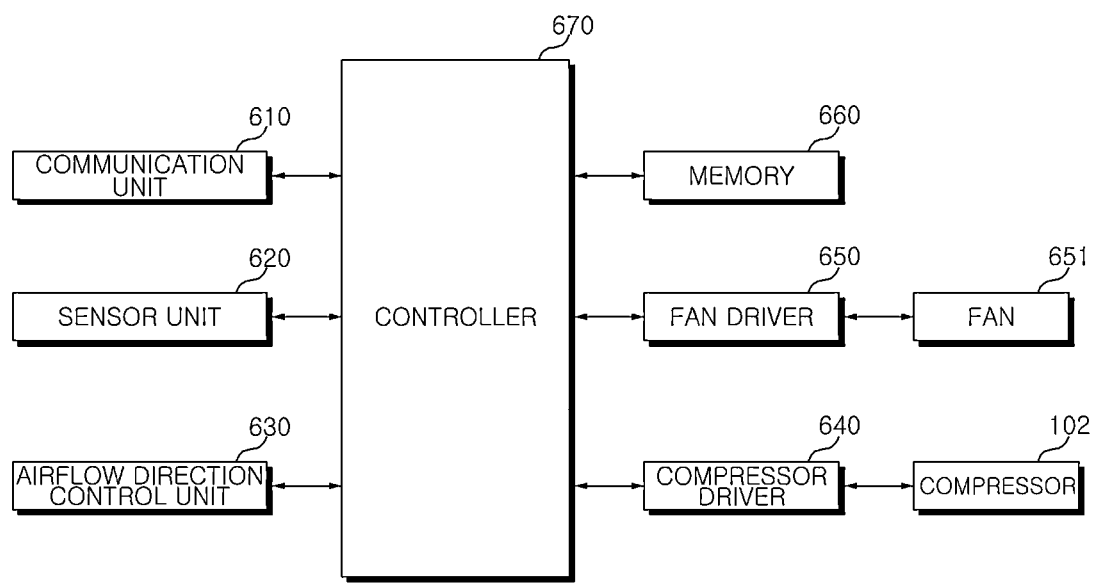
FIG. 6 is a block diagram of an air conditioner according to an embodiment.
Figure 7:
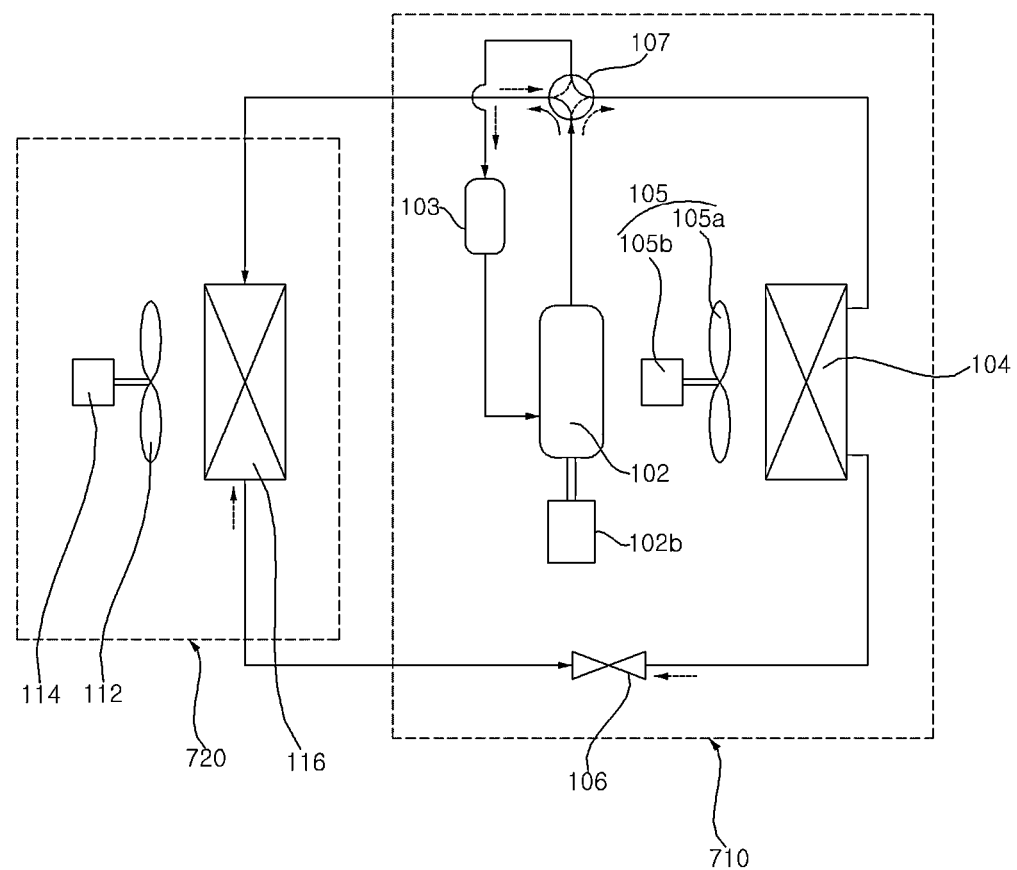
FIG. 7 is a schematic diagram of an outdoor unit and an indoor unit according to an embodiment.

FIG. 6 is a block diagram of an air conditioner according to an embodiment. FIG. 7 is a schematic diagram of an outdoor unit and an indoor unit according to an embodiment.

Referring to FIGS. 6 and 7, the air conditioner 100 may include a communication unit 610, a sensor unit 620, a memory 600, a fan driver 650 that drives a fan 651, a compressor driver 640 that drives compressor 102, and/or a controller 670. The communication unit 610 may include at least one communication module. For example, the communication unit 610 may be provided for each of an outdoor unit 710 and an indoor unit 720, and the outdoor unit 710 and the indoor unit 720 may transmit and receive data with each other.

A communication method of the outdoor unit 710 and the indoor unit 720 may include, for example, not only a wired communication technology, such as communication using power lines, serial communication, for example, RS-485 serial communication, and communication using a refrigerant pipe, but also a wireless communication technology, such as Wi-Fi, Bluetooth, Beacon, and Zigbee, for example.

The communication unit 610 may transmit and receive data to and from outside of the air conditioner 100. For example, the communication unit 610 may access a server connected to an external network to transmit and receive data.

The sensor unit 620 may include at least one sensor and may transmit data on a value, detected by the sensor, to the controller 670. The sensor unit 620 may include a heat exchanger temperature sensor (not shown). For example, the heat exchanger temperature sensor may be disposed in an indoor heat exchanger 108 to detect a temperature of the indoor heat exchanger 108.

The sensor unit 620 may include a pipe temperature sensor (not shown) that detects a temperature of a refrigerant flowing through each pipe. The sensor unit 620 may include a pressure sensor (not shown) that detects a pressure of gaseous refrigerant flowing through each pipe. The sensor unit 620 may include an indoor temperature sensor (not shown) that detects an indoor temperature and/or an outdoor temperature sensor (not shown) that detects an outdoor temperature. The sensor unit 620 may include an indoor humidity sensor (not shown) that detects an indoor humidity and/or an outdoor humidity sensor (not shown) that detects an outdoor humidity.

The sensor unit 620 may include an image sensor (not shown) that coverts light into an electrical signal. The image sensor may include a plurality of photodiodes corresponding to a plurality of pixels. The image sensor may include a charge-coupled device (CCD) image sensor or a complementary metal-oxide-semiconductor (CMOS) image sensor; however, embodiments are not limited thereto.

The air conditioner 100 may further include a lens through which light that emanates from a subject passes, and a digital signal processor that configures and processes an image based on a signal output from the image sensor, for example. The digital signal processor may be implemented as at least a portion of the processor 670 or as a separate processor operating independently from the processor 670. For example, in a case in which the digital signal processor is implemented as a separate processor, the image processed by the digital signal processor may be stored in the memory as it is or after being further processed by the controller 670.

Airflow direction control unit 630 may adjust an airflow direction of air discharged from the air conditioner 100. The airflow direction control unit 630 may include at least one vane disposed adjacent to an outlet through which air is discharged, a vane motor that drives the vane, and an airflow direction control fan, for example. For example, according to one embodiment, the airflow direction control unit 630, for example, airflow direction control unit 130 of FIG. 2, may include the first vane 140 coupled to two links 160 and 170, and the second vane 150 coupled to one of the links coupled to the first vane 140 and having one side rotatably coupled to the panel 120.

The compressor driver 640 may drive the compressor 102. The compressor driver 640 may include a rectifier (not shown) that rectifies AC power into DC power and outputs the rectified power; a DC terminal capacitor (not shown) that stores a ripple voltage from the rectifier; an inverter (not shown) including a plurality of switching elements to convert the smoothed DC power into 3-phase AC power having a predetermined frequency and output the power; and/or a compressor motor 102b that drives the compressor 102 according to the three-phase AC power.

The fan driver 650 may drive the fan 651 provided in the air conditioner 100. For example, the fan 651 may include an outdoor fan 105a and/or an indoor fan 112.

The fan driver 650 may include the rectifier (not shown) that rectifies AC power into DC power and outputs the rectified power; the DC terminal capacitor (not shown) that stores a ripple voltage from the rectifier; the inverter (not shown) including a plurality of switching devices to convert the smoothed DC power into 3-phase AC power having a predetermined frequency and output the power; and/or at least one motor that drives the fan 651 according to the 3-phase AC power. In addition, the fan driver 650 may include separate components that drives each of the outdoor fan 105a and the indoor fan 112. For example, the air conditioner 100 may include a first fan driver that drives the outdoor fan 105a and a second fan driver that drives the indoor fan 112.

The memory 660 may store data on a reference value associated with the operation of each component provided in the air conditioner 100. The memory 660 may store programs that process and control each signal in the controller 670, and may store processed data as well as data to be processed. For example, the memory 660 may store application programs designed for performing various operations that may be processed by the controller 670, and in response to a request of the controller 670, the memory 660 may selectively provide some of the stored application programs. The memory 660 may include at least one of a volatile memory, for example, DRAM, SRAM, or SDRAM, for example, and a non-volatile memory, for example, flash memory, hard disk memory (HDD), and solid-state drive (SSD), for example.

The controller 670 may include at least one processor and may control an overall operation of the air conditioner 100 using the processor included therein. The processor may be a general processor, such as a central processing unit (CPU), for example. Obviously, the processor may be a dedicated device, such as an ASIC, or other hardware-based processor, for example.

The controller 670 may control the overall operation of the air conditioner 100. The controller 670 may be connected to the respective components provided in the air conditioner 100 and may transmit and/or receive signals with the respective components to control the overall operation of the respective components.

The controller 670 may control the operation of the fan driver 650 to change the RPM of the fan 651. For example, by changing a frequency of three-phase AC power output to the outdoor fan motor 105b under the control of the controller 670, the fan driver 650 may change the RPM of the outdoor fan 105a. For example, by changing a frequency of the three-phase AC power output to the indoor fan motor 114 under the control of the controller 670, the fan driver 650 may change the RPM of the indoor fan 112.

The controller 670 may control the operation of the compressor driver 640 to change an operating frequency of the compressor 102. For example, by changing the frequency of the three-phase AC power output to the compressor motor 102b under the control of the controller 670, the compressor driver 640 may change the operating frequency of the compressor 102.

The controller 670 may obtain data associated with the respective components provided in the air conditioner 100. In this case, by considering a computational load, the controller 670 may obtain data associated with the respective components provided in the air conditioner 100 at predetermined time intervals during a predetermined period. The data associated with the respective components provided in the air conditioner 100 may include, for example, the operating frequency of the compressor 102, the temperature of refrigerant flowing into the compressor 102, the temperature of refrigerant discharged from the compressor 102, the pressure of refrigerant flowing into the compressor 102, the pressure of refrigerant discharged from the compressor 102, a pipe temperature at an inlet side of the indoor unit 720, a pipe temperature at an outlet side of the indoor unit 720, and an opening degree of an Electric Expansion Valve (EEV), for example.

The controller 670 may perform various operations based on the obtained data and may control the overall operation of the respective components included in the air conditioner 100 based on operation results. The controller 670 may process the image acquired by the image sensor. For example, the controller 670 may remove noise from the image or may perform signal processing on the image, such as gamma correction, color filter array interpolation, color matrix, color correction, and color enhancement, for example.

The controller 670 may detect an object included in the image using at least one method. For example, the controller 670 may extract characteristic points from the image using a method, such as scale invariant feature transform (SIFT), histogram of oriented gradient (HOG), for example, and may detect the object included in the image based on the extracted characteristic points. In this case, the controller 670 may detect the object included in the image by determining a boundary of the object using an algorithm, such as support vector machine (SVM), and AdaBoost, for example.

Based on the plurality of processed images, the controller 670 may detect a motion of the object included in the plurality of images. For example, using a dense optical flow method, the controller 670 may calculate a motion vector for a plurality of pixels constituting the object detected in the image, and may calculate the motion of the object based on the calculated motion vector. In this embodiment, the calculation is performed using the dense optical flow method; however, embodiments are not limited thereto, and a sparse optical flow method for calculating a motion vector of some characteristic pixels may also be used.

The controller 670 may determine an activity level of the object detected in the image. For example, the controller 670 may determine, as an activity level of the object detected in the image, a value obtained by dividing a sum of magnitudes of motion vectors for pixels included in the object by the number of pixels included in the object.

The controller 670 may be provided not only in the outdoor unit 710 and the indoor unit 720, but also in a central controller that controls operation of the outdoor unit 710 and/or the indoor unit 720. The outdoor unit 710 may include a compressor 102b that compresses a refrigerant; compressor motor 102b that drives the compressor 102b; outdoor heat exchanger 104 that radiates heat of the compressed refrigerant; the outdoor fan 105a disposed on one side of the outdoor heat exchanger 104 and accelerating heat radiation from the refrigerant; motor 105b that rotates the outdoor fan 105a; expansion valve 106 that expands condensed refrigerant; cooling/heating switch valve 107 that changes a passage of the compressed refrigerant; and accumulator 103 that temporarily stores gaseous refrigerant to remove moisture and foreign matter from the refrigerant and supplies the refrigerant at constant pressure to the compressor.

The indoor unit 720 may include indoor heat exchanger 108 disposed indoors and performing cooling/heating operations, and indoor fan 112 disposed on one side of the indoor heat exchanger 108 and accelerating heat radiation from the refrigerant; and a motor 114 for rotating the indoor fan 112.

Figure 8A:
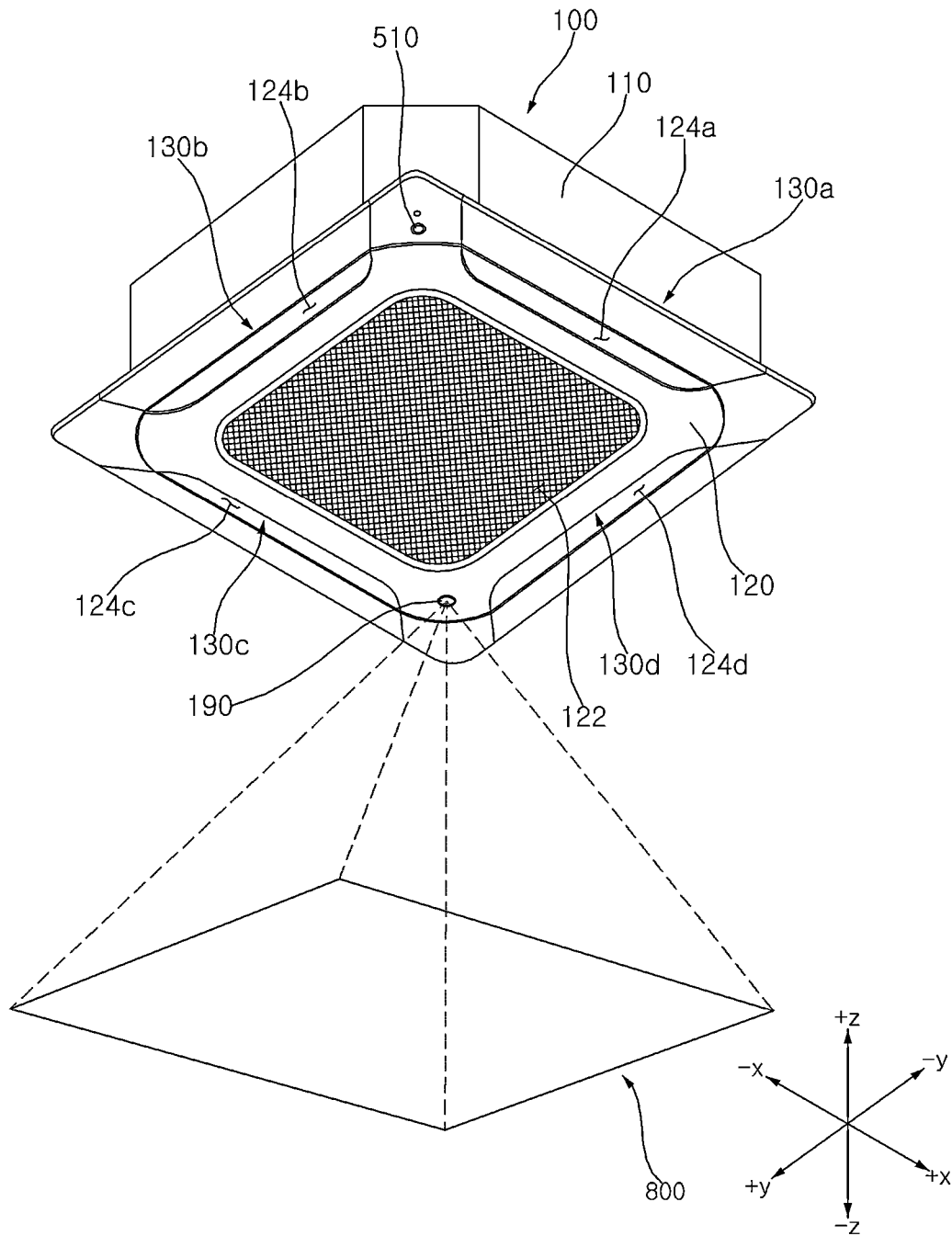
FIGS. 8A to 8C are diagrams referred to in the description of the operation of an airflow direction control unit provided in an air conditioner according to an embodiment.
Figure 8B:
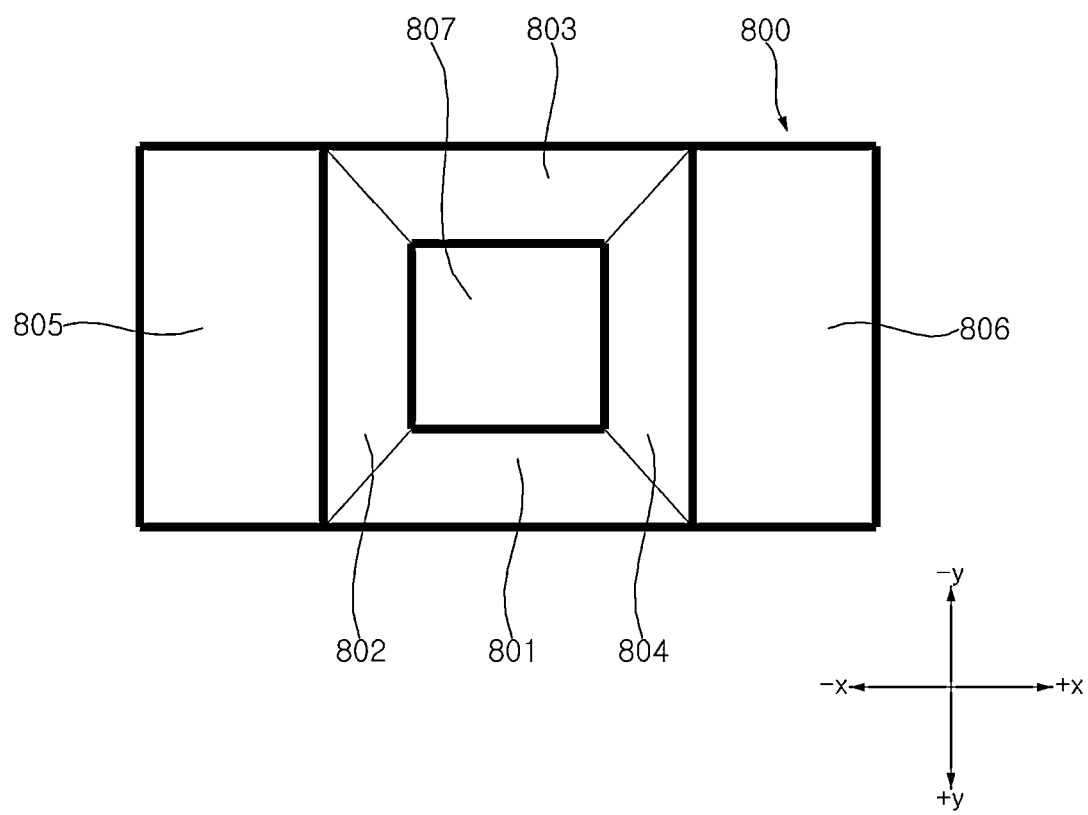
Figure 8C:
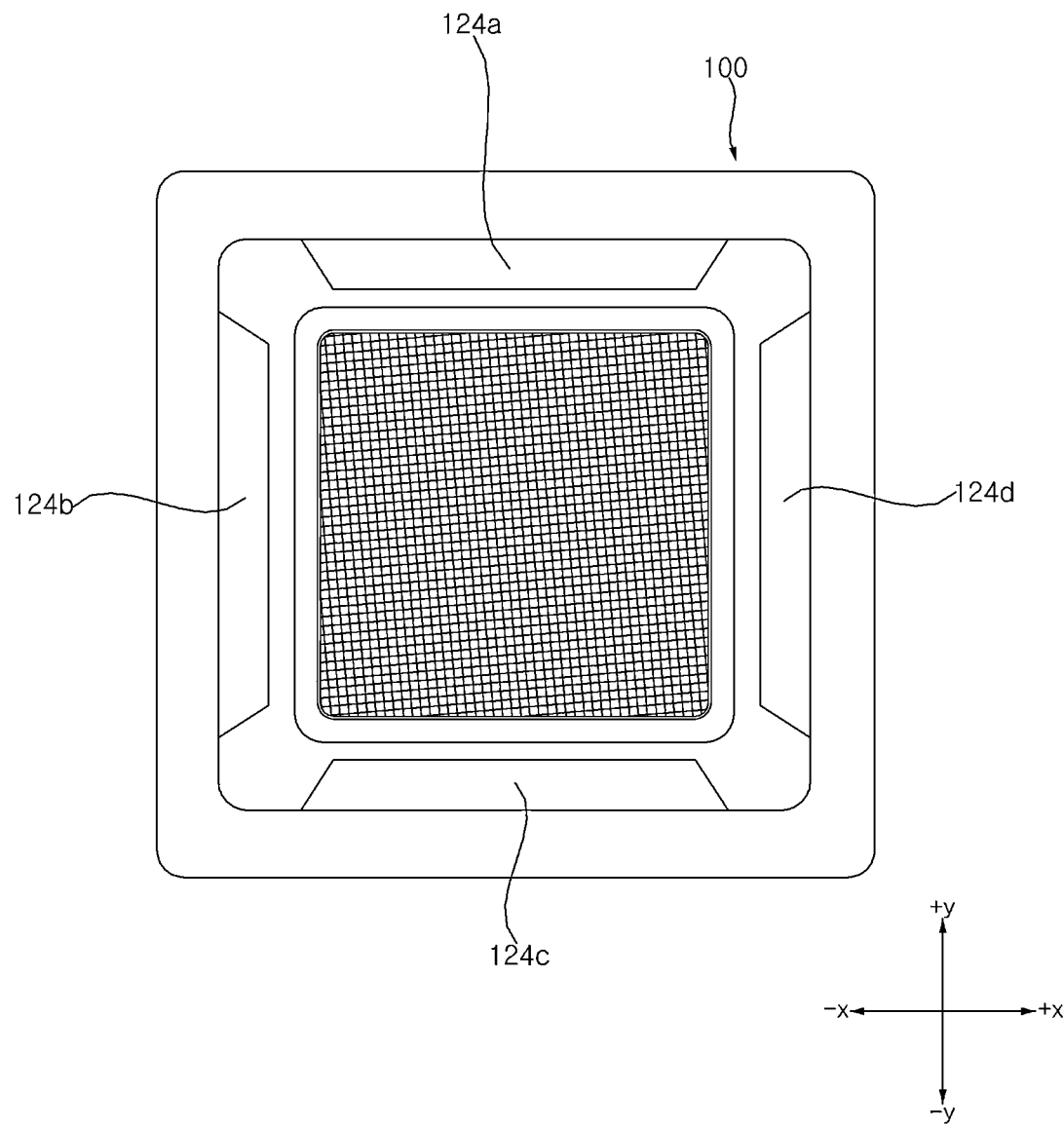

FIGS. 8A to 8C are diagrams referred to in the description of the operation of an airflow direction control unit included in an air conditioner according to an embodiment. In the following description, directions of the air conditioner 100 may be defined based on an orthogonal coordinates system illustrated in FIGS. 8A to 8C. In the orthogonal coordinates system, the x-axis direction may be defined as a left and right or lateral direction of the air conditioner 100. In this case, with respect to an origin point, a right or a first direction may be oriented in the direction of the positive x-axis, and a left or second direction may be oriented in the direction of the negative x-axis. The y-axis direction may be defined as a forward and backward direction of the air conditioner 100. In this case, with respect to the origin point, a forward direction may be oriented in the direction of the positive y-axis, and a backward direction may be oriented in the direction of the negative y-axis. The z-axis direction may be defined as an upward and downward or vertical direction. With respect to the origin point, an upward direction may be oriented in the direction of the positive z-axis, and a downward direction may be oriented in the direction of the negative z-axis.

Referring to FIG. 8A, the air conditioner 100 may obtain an image corresponding to a predetermined indoor space 800 using camera 190. The camera 190 may be implemented as a lens, an image sensor, and a digital signal processor, for example. For example, light emanating from the indoor space 800 may pass through the lens to be incident on the image sensor, and the image sensor may convert the light into an electrical signal. In this case, the signal output from the image sensor may be transmitted to the controller 670 as it is or after being processed by the digital signal processor 670. In this embodiment, one camera 190 is provided in the air conditioner 100; however, embodiments are not limited thereto, and two or more cameras 190 may be provided in the air conditioner 100.

Based on the signal transmitted from the image sensor and/or the digital signal processor, the controller 670 may obtain the image corresponding to the indoor space 800. By processing the image corresponding to the indoor space 800, the controller 670 may perform determination on the indoor space 800.

In the case in which the air conditioner 100 is mounted on a ceiling, the camera 190 may be directed downward from the air conditioner 100. For example, the camera 190 may be disposed on one side of the panel 120 disposed under the case 110 of the air conditioner 100.

Referring to FIGS. 8B and 8C, the indoor space 800 may be divided into a plurality of areas. The plurality of areas may correspond to at least one of the plurality of outlets 124 of the air conditioner 100.

A first area 801 of the indoor space 800 may correspond to the first outlet 124 of the air conditioner 100. A second area 802 of the indoor space 800 may correspond to the second outlet 124b of the air conditioner 100. A third area 803 of the indoor space 800 may correspond to the third outlet 124c of the air conditioner 100. A fourth area 804 of the indoor space 800 may correspond to the fourth outlet 124d of the air conditioner 100. A fifth area 805, which is located to the left or laterally of the second area 802 of the indoor space 800, may correspond to the second outlet 124b of the air conditioner. A sixth area 806, which is located to the right or laterally of the fourth area 804, may correspond to the fourth outlet 124d of the air conditioner 100. A seventh area 807, surrounded by the first area 801 to the fourth area 804 of the indoor space 800, may correspond to the first outlet 124a to the fourth outlet 124d of the air conditioner 100.

In one embodiment, the indoor space 800 may further include an area located in front of the first area 801 of the indoor space 800 and/or an area located behind the third area 803 of the indoor space. In this case, the area located in front of the first area 801 may correspond to the first outlet 124a of the air conditioner 100, and the area located behind the third area 803 may correspond to the third outlet 124c of the air conditioner.

By controlling operation of the airflow direction control unit 630, the controller 670 may control airflow directions of air flowing toward the indoor space 800 for the respective corresponding areas. For example, by controlling the vane motor of the airflow direction control unit 630, the controller 670 may generate an airflow of air flowing toward the first area 801 as a vertical airflow perpendicular to the ground, and an airflow of air flowing toward the second area 802 as a horizontal airflow horizontal to the ground. In this case, an inclination angle formed by the vanes 140 and 150 disposed at the first outlet 124a may be different from an inclination angle formed by the vanes 140 and 150 disposed at the second outlet 124b.

Figure 9:
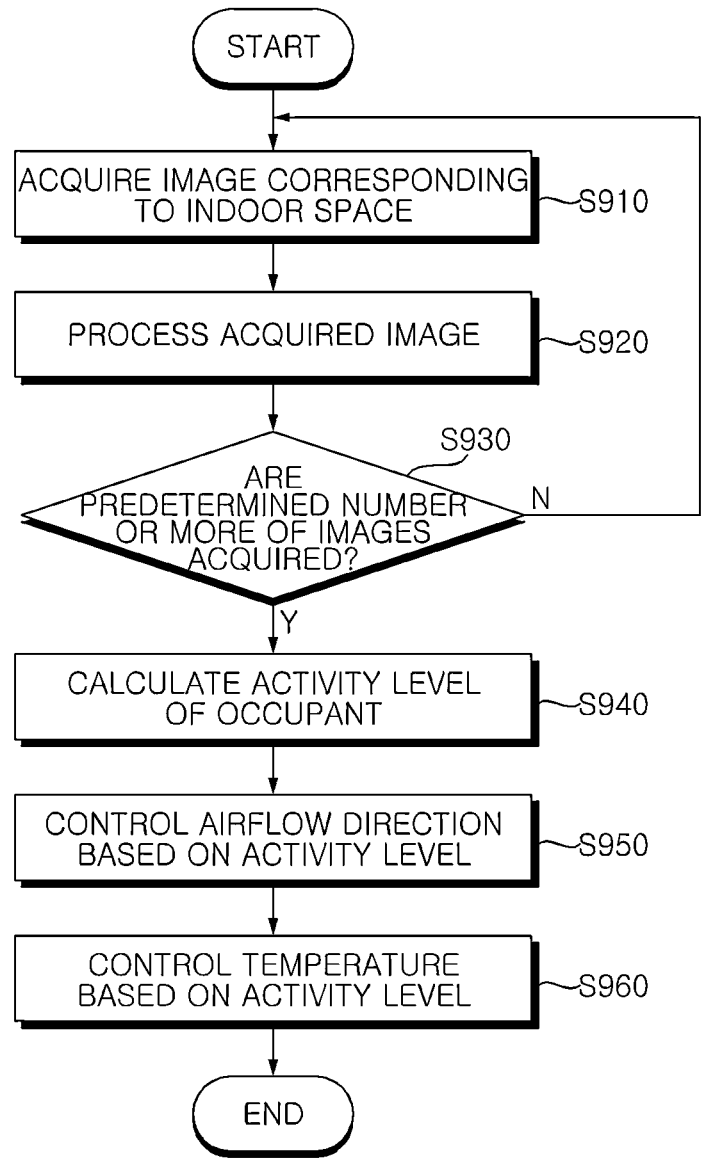
FIGS. 9 and 10 are flowcharts of a method for operating an air conditioner according to an embodiment.
Figure 10:
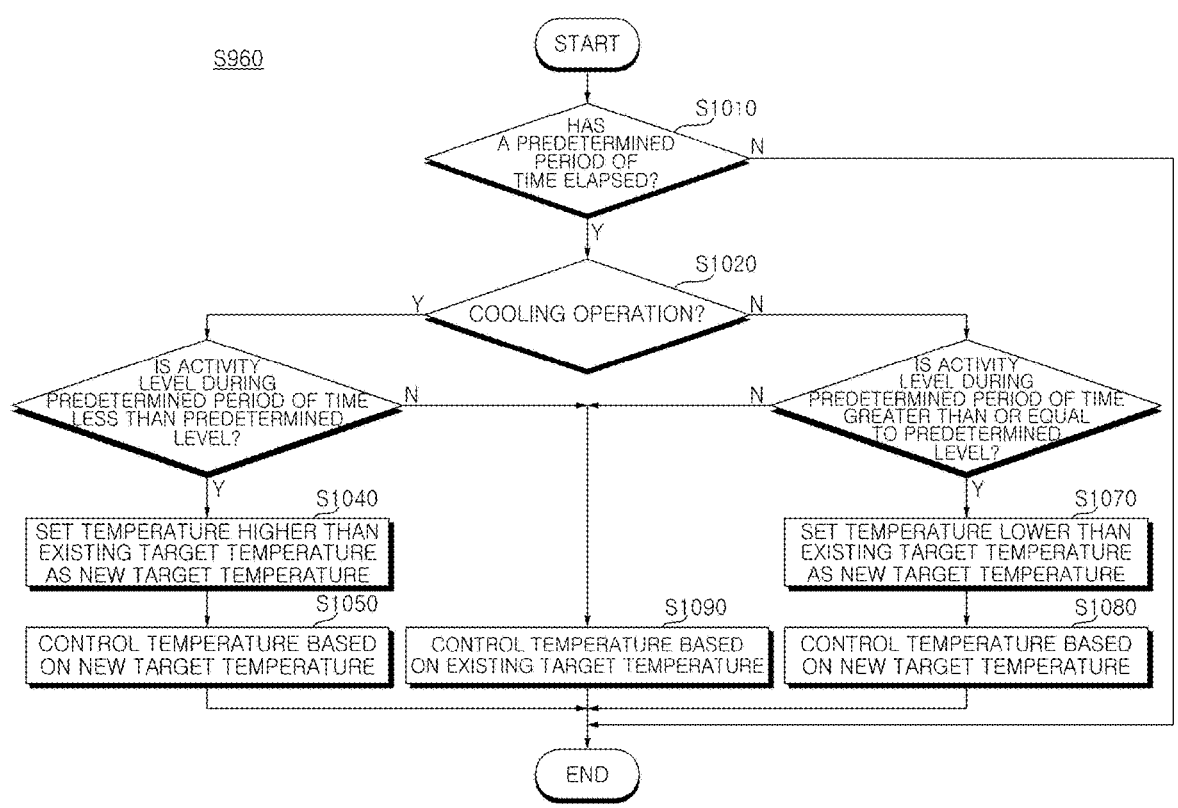

FIGS. 9 and 10 are flowcharts of a method for operating an air conditioner according to an embodiment. Referring to FIG. 9, the air conditioner 100 may acquire an image corresponding to a predetermined indoor space using the camera 190 in operation S910. For example, by processing a signal output from the image sensor included in the camera 190, the air conditioner 100 may acquire the image corresponding to the indoor space.

In operation S920, the air conditioner 100 may process the image corresponding to the indoor space and captured by the camera 190. For example, the air conditioner 100 may remove noise from the image corresponding to the indoor space, or may perform signal processing on the image, such as color correction, or color enhancement, for example. For example, the air conditioner 100 may detect an object included in the image corresponding to the indoor space, using a support vector machine (SVM) algorithm, for example.

In operation S930, the air conditioner 100 may determine whether a predetermined number or more of images are acquired. The predetermined number may refer to a minimum number of images for calculating the motion of an object present in an indoor space.

If the number of obtained images is less than the predetermined number, the air conditioner 100 may repeatedly perform an operation of obtaining images corresponding to the indoor space using the camera 190 and processing the obtained images. For example, the air conditioner 100 may repeatedly acquire images corresponding to the indoor space using the camera 190 during a predetermined period of time, and may process the images acquired during the predetermined period of time and may store the processed images in the memory 660.

In operation S940, upon acquiring the predetermined number or more of the images, the air conditioner 100 may calculate an activity level of an occupant present in the indoor space based on the images. Referring to 1110 of FIG. 11, the air conditioner 100 may acquire the predetermined number or more of images. The predetermined number or more of images may be processed by the controller 670 and may be stored in the memory 660. The air conditioner 100 may detect the respective objects included in the predetermined number or more of images.

Figure 11:
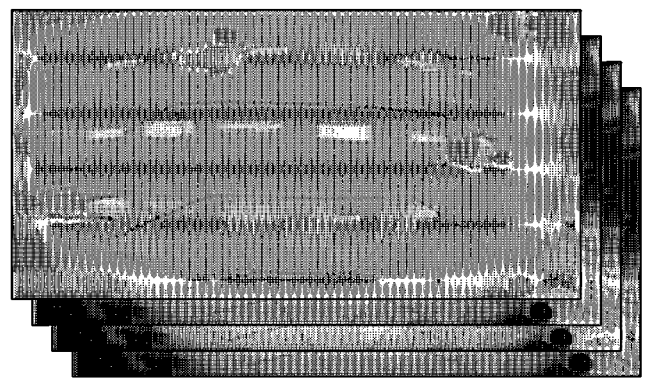
FIGS. 11 to 13 are diagrams referred to in the description of the operation of an air conditioner according to an activity level of an occupant.
Figure 11:
Figure 11:
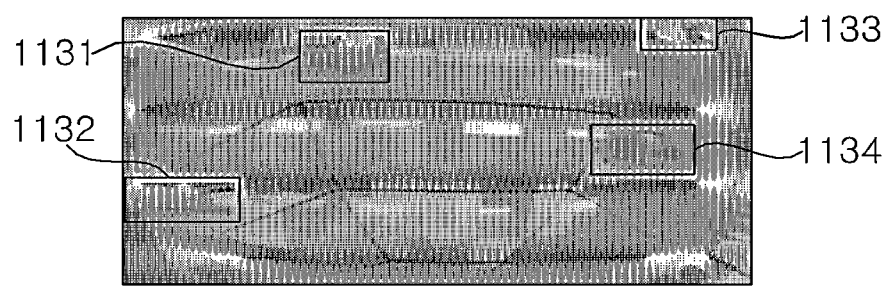

Referring to 1120 of FIG. 11, the air conditioner 100 may detect motion of the objects included in the predetermined number or more of the images. For example, the air conditioner 10 may calculate motion vectors for pixels of the objects detected in the predetermined number or more of images using a dense optical flow method, and may calculate the motion of the objects based on the calculated motion vectors.

Referring to 1130 of FIG. 11, the air conditioner 100 may detect an activity level of objects 131 to 1134 detected in the predetermined number or more of the images. For example, the air conditioner 10 may determine the activity level of a first object 1131 using a value obtained by dividing a sum of magnitudes of the motion vectors for pixels included in the first object 1131 by the number of the pixels included in the first object 1131. In this case, even when the occupant moves in place, the magnitudes of the motion vectors for the plurality of pixels of the object are accumulated according to the movement of the occupant, such that the air conditioner 100 may accurately determine the activity level of the occupant.

The air conditioner 100 may determine an activity level for each of a plurality of corresponding areas of the indoor space. For example, if an occupant stays in a specific area among the plurality of areas of the indoor space, an activity level of the occupant, which is determined by the air conditioner 100, may be matched to the specific area in which the occupant is present. In the case in which the occupant moves in the indoor space, the location of an object included in the plurality of images may be changed in each image.

Figure 12A:
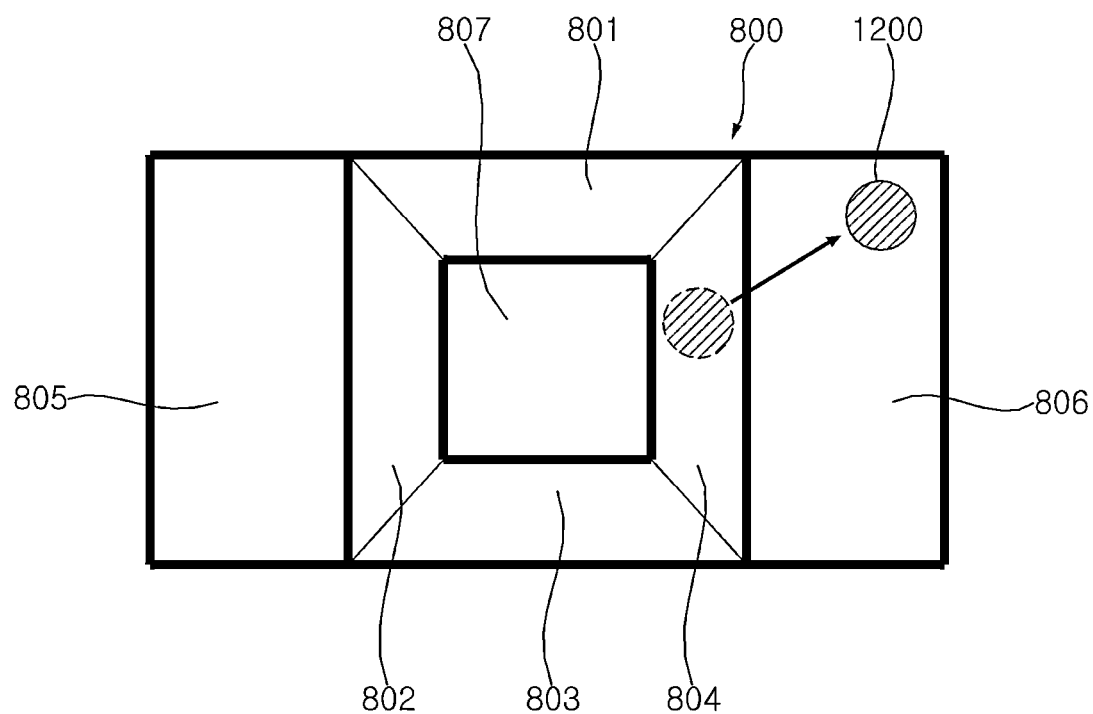
Figure 12B:
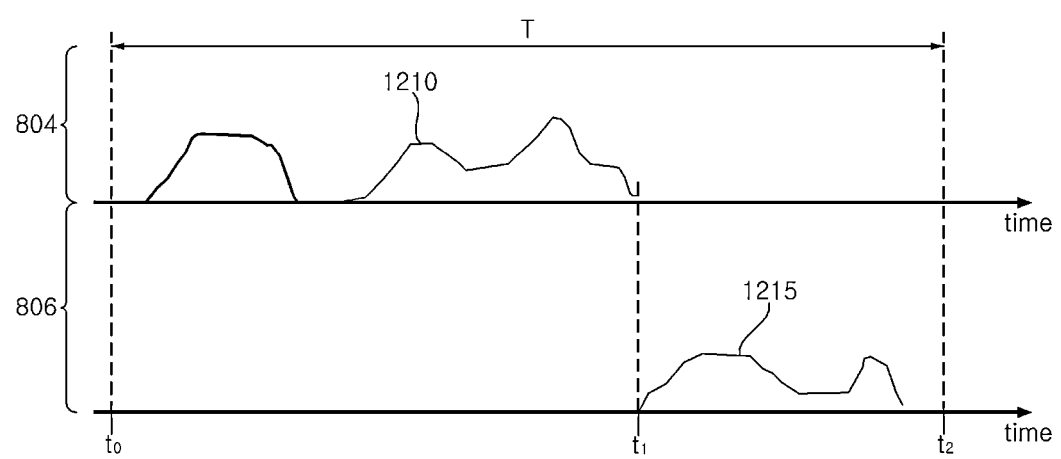

Referring to FIGS. 12A and 12B, while an occupant 1200 moves from a fourth area 804 to a sixth area 806 in an indoor space 800, the location of the occupant 1200 may be detected in at least one of the fourth area 804 or the sixth area 806. For example, the occupant 1200 may be detected in the fourth area 804 in a first acquired image and may be detected in the sixth area 806 in a last acquired image, among a predetermined number or more of images.

In addition, during a predetermined period T when the occupant 1200 moves from the fourth area 804 to the sixth area 806, a magnitude 1210 of a motion vector calculated for the fourth area 804 and a magnitude 1215 of a motion vector calculated for the sixth area 806 may be separated at a time point $t_1$. In this case, in one embodiment, the air conditioner 100 may determine an area, corresponding to the location where the object is detected, in the last acquired image among the predetermined number or more of the images to be an area corresponding to the activity level of the object. For example, the air conditioner 100 may determine, as the activity level of the occupant 1200, a value obtained by dividing a sum of the magnitudes 1210 and 1215 of the motion vectors, calculated while the occupant 1200 moves from the fourth area 804 to the sixth area 806, by the number of pixels constituting the occupant 1200 in a predetermined image. Further, the air conditioner 100 may match the determined activity level of the occupant 1200 to the sixth area 806, in which the occupant 1200 is detected in the last acquired image.

In another embodiment, the air conditioner 100 may determine the activity level of the object for each area, in which the object is detected, in the predetermined number or more of the images, and may match the activity level of the occupant, which is determined for a specific area, to the specific area.

For example, using a value obtained by dividing a sum of the magnitudes 1210 of the motion vectors calculated for the fourth area 804 by the number of pixels constituting the occupant 1200 in a predetermined image, the air conditioner 100 may determine the activity level of the occupant 1200 in the fourth area 804, and may match the determined activity level of the occupant 1200 to the fourth area 804. In addition, using a value obtained by dividing a sum of the magnitudes 1215 of the motion vectors calculated for the sixth area 806 by the number of pixels constituting the occupant 1200 in a predetermined image, the air conditioner 100 may determine the activity level of the occupant 1200 in the sixth area 806, and may match the determined activity level of the occupant 1200 to the sixth area 806.

The air conditioner 100 may determine a total activity level corresponding to all the plurality of areas of the indoor space. For example, upon detecting a plurality of objects in the indoor space, the air conditioner 100 may determine the total activity level using a value, obtained by dividing a sum of magnitudes of motion vectors for all the pixels constituting the plurality of objects by the number of pixels constituting the plurality of objects.

The activity level determined by the air conditioner 100 may correspond to metabolic equivalent of task (MET). For example, the air conditioner 100 may calculate the MET, corresponding to the activity level, using a predetermined equation and may determine the activity level based on the calculated MET.

In one embodiment, the air conditioner 100 may determine the activity level based on MET data similar to the following Table 1. For example, if the MET is less than 1.0, the air conditioner 100 may determine the activity level to be 1; if the MET is greater than or equal to 1.0 and less than 2.0, the air conditioner 100 may determine the activity level to be 2; if the MET is greater than or equal to 2.0 and less than 3.0, the air conditioner 100 may determine the activity level to be 3; if the MET is greater than or equal to 3.0 and less than 4.0, the air conditioner 100 may determine the activity level to be 4; and if the MET is greater than or equal to 4.0, the air conditioner 100 may determine the activity level to be 5.

TABLE 1

| Intensity | Type | MET |
|---|---|---|
| Low | Sleep | 0.9 |
| | reading, watching television | 1.0 |
| | desk work (writing, typing, etc.) | 1.4 |
| Mid | playing an instrument | 2.0 |
| | walking (2 km/h) | 2.5 |
| | walking (3 km/h) | 2.9 |
| High | cleaning | 3.5 |
| | bicycling | 4.0 |
| | jump rope | 5.0 |

Referring to FIG. 9, in operation S950, the air conditioner 100 may control the airflow direction of air, flowing toward the indoor space, based on the calculated activity level of the occupant present in the indoor space. According to the activity level corresponding to the respective areas of the indoor space, the air conditioner 100 may control each airflow direction of the air flowing toward the plurality of areas.

For example, during a cooling operation, if the activity level corresponding to the first to third areas 801 to 803 is 1 or 2, and the activity level corresponding to the fourth area 804 is 4, the air conditioner 100 may determine an airflow direction of air flowing toward the first to third areas 801 to 803 to be an indirect airflow, and an airflow direction of air flowing toward the fourth area 804 to be a direct airflow. In this case, the air conditioner 100 may control the airflow direction control unit 630 so that an inclination angle formed by the vanes 140 and 150 disposed at the first to third outlets 124a to 124c may correspond to the indirect airflow, and an inclination angle formed by the vanes 140 and 150 disposed at the fourth outlet 124d may correspond to the direct airflow.

For example, during the cooling operation, if the activity level corresponding to the fifth area 805 is 3, the air conditioner 100 may determine an airflow direction of air flowing toward the fifth area 805 to be a diagonal airflow. In this case, the air conditioner 100 may control the airflow direction control unit 630 so that an inclination angle formed by the vanes 140 and 150 disposed at the second outlet 124b may correspond to the diagonal airflow.

For example, during the cooling operation, if the activity level corresponding to the sixth area 806 is 4, the air conditioner 100 may determine an airflow direction of air flowing toward the sixth area 806 to be a diagonal airflow and a vertical airflow. In this case, the air conditioner 100 may control the airflow direction control unit 630 so that an inclination angle formed by the vanes 140 and 150 disposed at the fourth outlet 124b may be continuously changed between the diagonal airflow and the vertical airflow.

For example, during the cooling operation, if the activity level corresponding to the seventh area 807 is 3, the air conditioner 100 may determine an airflow direction of air flowing toward the seventh area 807 to be a diagonal airflow. In this case, the air conditioner 100 may control the airflow direction control unit 630 so that inclination angles formed by the vanes 140 and 150 disposed at the first to fourth outlets 124a to 124b all correspond to the diagonal airflow.

For example, during a heating operation, if the activity level corresponding to the first area 801 is 1 or 2, and the activity level corresponding to the third area 803 is 4, the air conditioner 100 may determine an airflow direction of air flowing toward the first area 801 to be the direct airflow, and an airflow direction of air flowing toward the third area 803 to be the indirect airflow. In this case, the air conditioner 100 may control the airflow direction control unit 630 so that an inclination angle formed by the vanes 140 and 150 disposed at the first outlet 124a may correspond to the direct airflow, and an inclination angle formed by the vanes 140 and 150 disposed at the third outlet 124c corresponds to the indirect airflow.

Further, the air conditioner 100 may also adjust the airflow direction of air flowing toward the indoor space based on an airflow predetermined according to user preference. For example, in the case where a user sets an indirect airflow as a preferred airflow during the cooling operation, if an activity level corresponding to the first area 801 is greater than or equal to 4 and an activity level corresponding to the second to fourth areas 802 to 804 is 1 or 2, the air conditioner 100 may determine an airflow direction of air, flowing toward the first area 801, to be the indirect airflow and may determine an airflow direction of air, flowing toward the second to fourth areas 802 to 804, to be the direct airflow as an airflow different from the user's preferred airflow. In this case, the air conditioner 100 may control the airflow direction control unit 630 so that the angle formed by the vanes 140 and 150 disposed at the first outlet 124a may correspond to the indirect airflow, and the angle formed by the vanes 140 and 150 disposed at the second to fourth outlets 124b to 124d may correspond to the direct airflow.

In operation S960, the air conditioner 100 may control the temperature of the indoor space based on the calculated activity level of the occupant present in the indoor space. The air conditioner 100 may control the temperature of the indoor space bases on a total activity level corresponding to all the plurality of areas of the indoor space, which will be described hereinafter with reference to FIG. 10.

Referring to FIG. 10, the air conditioner 100 may determine whether a predetermined period of time has elapsed in operation S1010. The predetermined period of time may refer to a period during which the air conditioner 100 determines whether to change a target temperature in order to control the temperature of the indoor space. For example, the air conditioner 100 may control the temperature of the indoor space at predetermined five-minute intervals based on the calculated activity level of the occupant present in the indoor space.

If the predetermined period of time has not elapsed, the air conditioner 100 may control the temperature of the indoor space according to a current set target temperature. If the predetermined period of time has elapsed, the air conditioner 100 may determine whether a cooling operation is performed in operation S1020.

If the cooling operation is performed, the air conditioner 100 may determine whether a total activity level during the predetermined period of time is maintained at a level less than a predetermined level in operation S1030. For example, if the total activity level corresponding to all of the plurality of areas during a five-minute period is less than 3, the air conditioner 100 may determine that the total activity level during the predetermined period of time is maintained at a level less than the predetermined level.

If the total activity level during the predetermined period of time is maintained at a level less than the predetermined level, the air conditioner 100 may set a temperature higher than the existing target temperature as a new target temperature in S1040. That is, if the total activity level during the predetermined period of time is maintained at a level less than the predetermined level, the air conditioner 100 may determine that an activity level of the occupant is sufficiently low, and may increase the target temperature to reduce power consumption.

The existing target temperature may refer to a target temperature determined according to a desired temperature set by a user. For example, in the case where a desired temperature set by a user is 18° C., if cooling performance is at a first level, the air conditioner 100 may determine the existing target temperature to be 23° C., if cooling performance is at a second level, the air conditioner 100 may determine the existing target temperature to be 21° C., and if cooling performance is at a third level, the air conditioner 100 may determine the existing target temperature to be 18° C.

Upon setting a higher temperature than the existing target temperature as a new target temperature, the air conditioner 100 may determine the new target temperature based on the determined total activity level during the predetermined period of time. For example, if an average of the total activity levels during the predetermined period of time is less than 2, the air conditioner 100 may determine a temperature higher than the existing target temperature by a first temperature, for example, 2° C., as the new target temperature, and if an average of the total activity levels during the predetermined period of time is greater than or equal to 2, the air conditioner 100 may determine a temperature higher than the existing target temperature by a second temperature, for example, 1° C., as the new target temperature.

If the new target temperature, determined based on the total activity level during the predetermined period of time, is greater than or equal to a maximum target temperature, for example, 28° C., during the cooling operation, the air conditioner 100 may set the maximum target temperature, for example, 28° C., as the new target temperature. Alternatively, if the new target temperature, determined based on the total activity level during the predetermined period of time, is greater than or equal to a maximum target temperature, for example, 28° C., during the cooling operation, the air conditioner 100 may set the existing target temperature as the new target temperature.

The air conditioner 100 may control the indoor temperature based on the new target temperature in operation S1050. For example, if a current indoor temperature is lower than the new target temperature by a reference value, for example, 1° C., or more, the air conditioner 100 may decrease an operating frequency of the compressor 102, and if the current indoor temperature is greater than or equal to the new target temperature by the reference value, for example, 1° C., or more, the air conditioner 100 may increase an operating frequency of the compressor 102.

During a heating operation, the air conditioner 100 may determine whether the total activity level during the predetermined period of time is maintained at a level greater than or equal to the predetermined level in operation S1060. For example, if an average of total activity levels corresponding to the plurality of areas during a five-minute period is greater than or equal to 3, the air conditioner 100 may determine that the total activity level during the predetermined period of time is maintained at a level greater than or equal to the predetermined level.

If the total activity level during the predetermined period of time is maintained at a level greater than or equal to the predetermined level, the air conditioner 100 may set a temperature lower than the existing target temperature as a new target temperature in operation S1070. That is, if the total activity level is maintained at a level greater than or equal to the predetermined level during the predetermined period of time, the air conditioner 100 may determine that the activity level of an occupant is sufficiently high and may lower the target temperature to reduce power consumption.

The existing target temperature may refer to a target temperature determined according to a desired temperature set by a user. For example, in the case where a desired temperature set by a user is 21° C., if heating performance is at a first level, the air conditioner 100 may determine the existing target temperature to be 21° C., if heating performance is at a second level, the air conditioner 100 may determine the existing target temperature to be 24° C., and if heating performance is at a third level, the air conditioner 100 may determine the existing target temperature to be 26° C.

When setting a temperature lower than the existing target temperature as the new target temperature, the air conditioner 100 may determine the new target temperature based on the total activity level determined during the predetermined period of time. For example, if an average of the total activity levels during the predetermined period of time is less than 4, the air conditioner 100 may determine a temperature lower than the existing target temperature by a first temperature, for example, 1° C., as the new target temperature, and if an average of the total activity levels during the predetermined period of time is greater than or equal to 4, the air conditioner 100 may determine a temperature lower than the existing target temperature by a second temperature, for example, 2° C., as the new target temperature.

If the new target temperature, determined based on the total activity level during the predetermined period of time, is lower than a minimum target temperature, for example, 18° C., during the heating operation, the air conditioner 100 may set the minimum target temperature, for example, 18° C., as the new target temperature. Alternatively, if the new target temperature, determined based on the total activity level during the predetermined period of time, is lower than the minimum target temperature, for example, 18° C., during the heating operation, the air conditioner 100 may set the existing target temperature as the new target temperature.

The air conditioner 100 may control the indoor temperature based on the new target temperature in operation S1080. For example, if a current indoor temperature is higher than the new target temperature by a reference value, for example, 1° C., or more, the air conditioner 100 may decrease an operating frequency of the compressor 102, and if the current indoor temperature is lower than the new target temperature by the reference value, for example, 1° C., or more, the air conditioner 100 may increase an operating frequency of the compressor 102.

If the total activity level during the predetermined period of time is greater than or equal to the predetermined level during the cooling operation of the air conditioner 100, or if the total activity level during the predetermined period of time is less than the predetermined level during the heating operation the air conditioner 100, the air conditioner 100 may control the indoor temperature based on the existing target temperature in operation S1090. In this case, the predetermined level used as a reference for determining the total activity level during the cooling operation may be the same as or different from the predetermined level used as a reference for determining the total activity during the heating operation.

Figure 13:
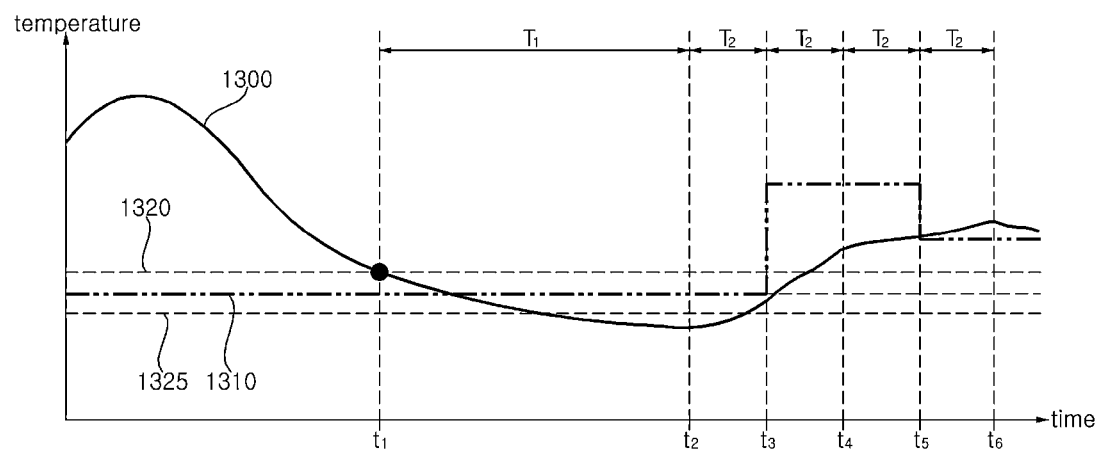

Referring to FIG. 13, the air conditioner 100 may perform the cooling operation based on an indoor temperature 1300, a variable target temperature 1310, and operating temperatures 1320 and 1325 set according to the existing target temperature.

Upon initiating the cooling operation, the air conditioner 100 may set the existing target temperature according to the desired temperature set by a user. For example, if the desired temperature set by the user is 21° C., the air conditioner 100 may set the existing target temperature to 24° C. In this case, each of the operating temperatures 1320 and 1325 may be set to be different from the determined existing target temperature by a predetermined temperature value, for example, 1° C.

The air conditioner 100 may perform the cooling operation so that the indoor temperature 1300 reaches the existing target temperature. In this case, the air conditioner 100 may increase a cooling capacity to a maximum level, so that at an initial stage after the cooling operation is initiated, the indoor temperature 1300 may rapidly reach the existing target temperature. For example, at the initial stage after initiating the cooling operation, the air conditioner 100 may increase the operating frequency of the compressor 102 to a predetermined maximum frequency.

In the case in which the indoor temperature 1300 reaches a first operating temperature 1320, the air conditioner 100 may lower the cooling capacity. For example, the air conditioner 100 may lower the operating frequency of the compressor 102 starting from a first time point $t_1$ when the indoor temperature 1300 reaches the first operating temperature 1320. In the case in which the indoor temperature 1300 reaches a second operating temperature 1325, the air conditioner 100 may lower the operating frequency of the compressor to a predetermined minimum frequency.

If a stabilization stage is satisfied in which an airflow and/or temperature is maintained at a predetermined level during a predetermined period $T_1$ from the first time point $t_1$ at which the indoor temperature 1300 reaches the first operating temperature 1320, the air conditioner 100 may activate a power saving mode based on the total activity level of an occupant, and starting from a time point $t_2$ at which the power saving mode is activated, the air conditioner 100 may perform the cooling operation based on the total activity level of the occupant.

Starting from the time point $t_2$ at which the power saving mode is activated, the air conditioner 100 may acquire images corresponding to the indoor space using the camera 190. In addition, the air conditioner 100 may reset the target temperature at predetermined time intervals $T_2$ according to the total activity level of the occupant calculated based on the acquired images.

For example, if an average of the total activity levels of the occupant which are calculated during a period from the time point $t_2$ to a third time point $t_3$ is less than 2, the air conditioner 100 may determine a temperature higher than the existing target temperature 1310 by a first temperature, for example, 2° C., to be a new target temperature, and may control the indoor temperature 1300 based on the determined new target temperature.

For example, if an average of the total activity levels of the occupant which are calculated during a period from a time point $t_4$ to a fifth time point $t_5$ is greater than or equal to 2, the air conditioner 100 may determine a temperature higher than the existing target temperature 1310 by a second temperature, for example, 1° C., to be the new target temperature, and may control the indoor temperature 1300 based on the determined new target temperature.

Figure 14:
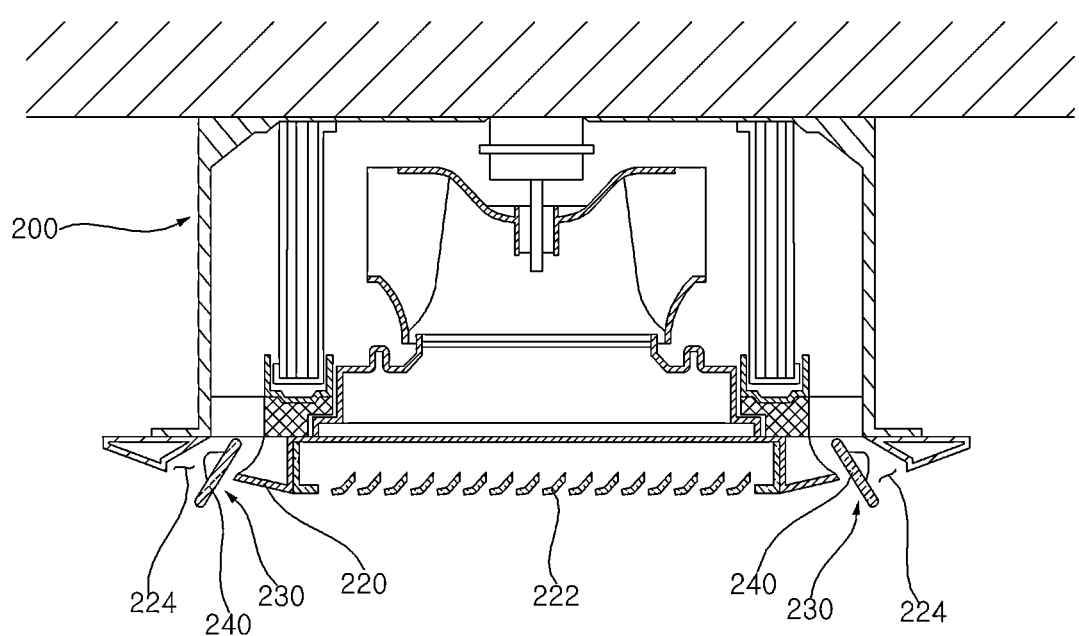
FIG. 14 is a cross-sectional view of one side of the air conditioner according to another embodiment.

Hereinafter, an air conditioner 200 according to another embodiment will be described with reference to FIGS. 14 to 15C. The air conditioner 200 according to this embodiment is different from the air conditioner 100 according to the previous embodiment in terms of a configuration of the airflow direction control unit 230. Accordingly, description of components other than the airflow direction control unit 230 may be replaced with the above description of the air conditioner 100 according to the previous embodiment.

The airflow direction control unit 230 of the air conditioner 200 according to this embodiment may include one vane 240 disposed at each outlet 224, and a vane motor (not shown) that drives the vane 240. An arrangement of the vane 240 may be changed by operation of the vane motor.

Figure 15A:
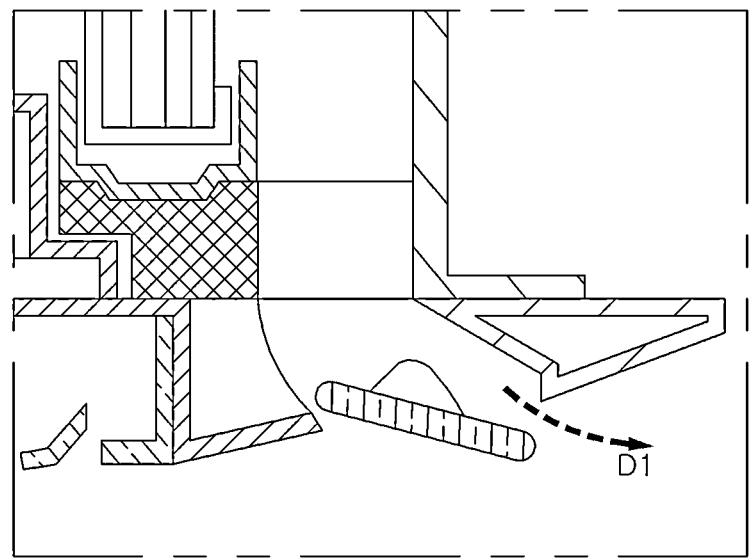
FIGS. 15A to 15C are diagrams explaining an arrangement at each position of the airflow direction control unit according to the embodiment of FIG. 14.
Figure 15B:
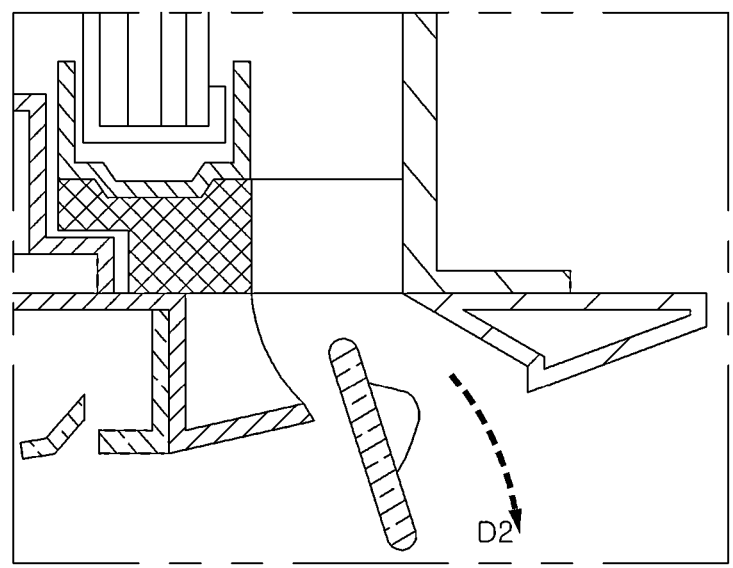
Figure 15C:
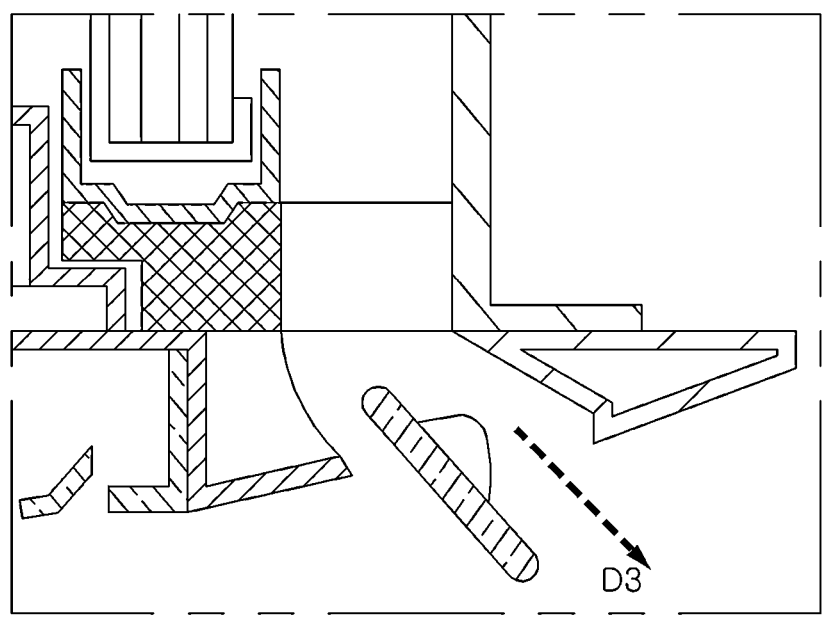

Referring to FIGS. 15A to 15C, by varying an inclination angle of the vane 240 disposed at the outlet 224, the airflow direction control unit 230 may control an airflow direction of air flowing through the outlet 224. The vane 240 may be disposed so as to close the outlet 224 or to adjust the airflow direction of air flowing through the outlet 224.

Referring to FIG. 15A, the airflow direction control unit 230 may be disposed in a first position P1 in which the vane 240 is disposed approximately parallel to a virtual horizontal line parallel to a ground. When the airflow direction control unit 230 is disposed in the first position P1, the vane 240 may form an inclination angle θ of 30 degrees or less with respect to a virtual horizontal line HL parallel to the ground. The inclination angle θ, which is formed between the vane 240 and the virtual horizontal line HL, may vary according to the arrangement of the vane 240.

Referring to FIG. 15B, the airflow direction control unit 230 may be disposed in a second position P2 in which the vane 240 is disposed approximately perpendicular to the horizontal line parallel to the ground. When the airflow direction control unit 230 is disposed in the second position P2, the vane 240 may form an inclination angle θ of 60 degrees or more with respect to the virtual horizontal line HL.

Referring to FIG. 15C, the airflow direction control unit 230 may be disposed in a third position P3 in which the vane 240 forms an angle between the first position P1 and the second position P2. When the airflow direction control unit 230 is disposed in the third position P3, the vane 240 may form an inclination angle θ, ranging from 30 degrees to 60 degrees, with respect to the virtual horizontal line HL.

When the airflow direction control unit 230 is disposed in the first position P1, an indirect airflow is formed so that air, discharged through the outlet, may flow in a direction horizontal to the ground. When the airflow direction control unit 230 is disposed in the second position P2, a vertical airflow is formed so that air, discharged through the outlet, may flow in a direction perpendicular to the ground. When the airflow direction control unit 230 is disposed in the third position P3, a diagonal airflow may be generated so that the air discharged through the outlet may flow in a direction between the indirect airflow and the vertical airflow.

As illustrated in FIGS. 5A and 5B, the air conditioner according to this embodiment may also cause the air discharged through the outlet 224 to flow in the first direction D1, the second direction D2, and the third direction D3 according to the first position P1, the second position P2, and the third position P3 of the airflow direction control unit 230.

Figure 16:
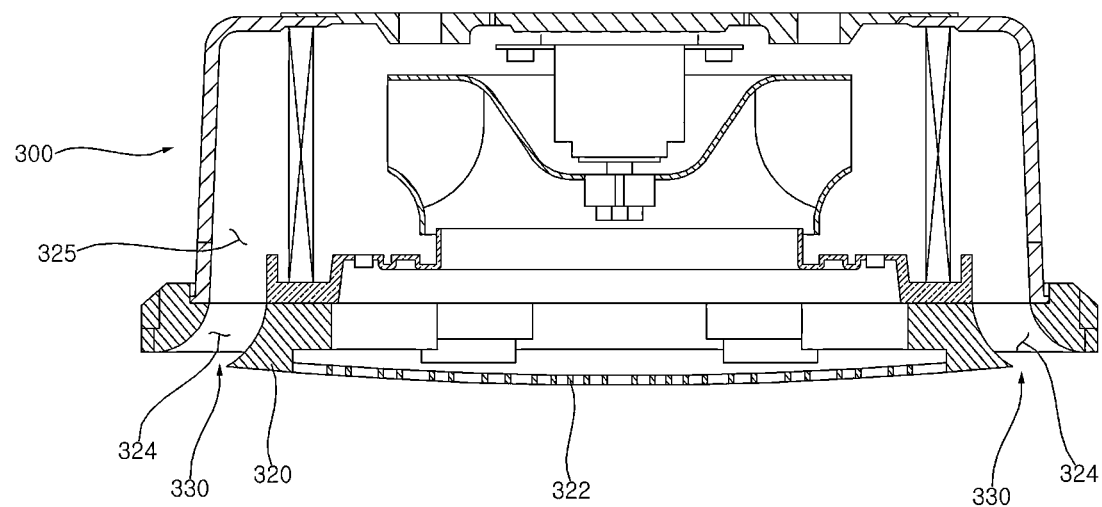
FIG. 16 is a cross-sectional view of one side of an air conditioner according to still another embodiment.

Hereinafter, an air conditioner according to still another embodiment will be described with reference to FIGS. 16 to 17C. Air conditioner 300 according to this embodiment is different from the air conditioner 100 according to the embodiment of FIG. 1 in terms of a configuration and operating structure of the air conditioner and the airflow direction control unit, as well as in terms of a shape of an outlet and an arrangement of a vane. Accordingly, description of components other than the shape of the outlet and the airflow direction control unit may be replaced with the above description of the air conditioner according to the embodiment of FIG. 1.

The air conditioner 300 according to this embodiment may have a plurality of outlets 324 formed on an outer circumference of an inlet 322. The inlet 322 may have a square shape, and the outlets 324 may be spaced apart outwardly from each side of the inlet 322. In addition, the inlet 322 may also have a circular shape. In this case, there may be a plurality of outlets 324 formed at positions spaced apart radially from an outer circumference of the circular inlet 322.

The outlets 324 formed at the air conditioner 300 according to this embodiment may have an outer end 324*b* disposed above an inner end 324*a*. Further, a discharge passage 325 formed over the outlet 324 may have a structure extending outwardly from an upper side toward a lower side.

The airflow direction control unit 330 of the air conditioner according to this embodiment may include a vane 340 disposed at a panel 320 and protruding to the outlet 324 with a variable protruding length; a vane motor (not shown) disposed in the panel 320 and driving the vane 340; and a vane gear 350 rotated by the vane motor and engaged with the vane 340 to move the arrangement of the vane 340. The vane 340 may have one end engaged with the vane gear 350 in a rack gear structure.

The vane 340 may be disposed at the inner end 324*a* of the outlet 324. The vane 340 may protrude outwardly from the inner end 324*a* of the outlet 324. The protruding length of the vane 340 that protrudes into the outlet 324 may be changed by operation of the vane motor. The airflow direction control unit 330 may control an airflow direction of air, flowing through the outlet 324, according to the protruding length of the vane 340 that protrudes into the outlet 324.

Figure 17A:
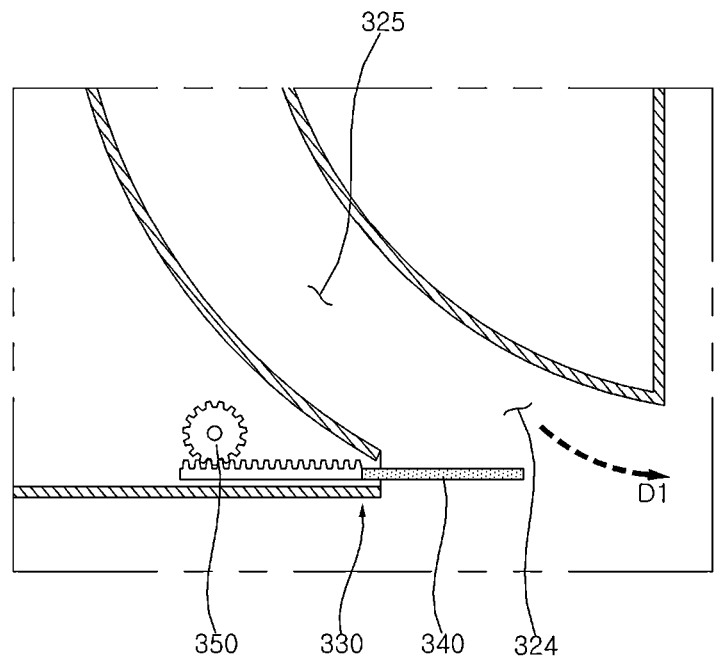
FIGS. 17A to 17C are diagrams explaining an arrangement at each position of the airflow direction control unit according to the embodiment of FIG. 16.
Figure 17B:
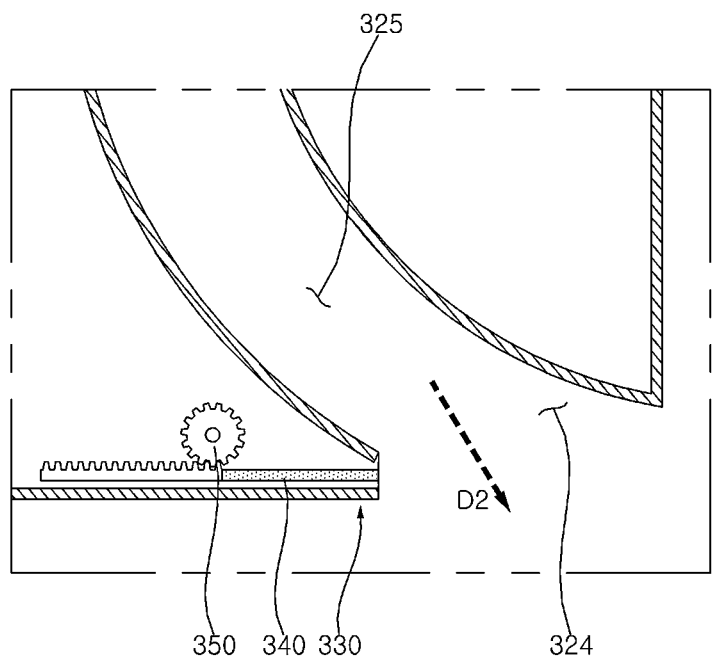
Figure 17C:
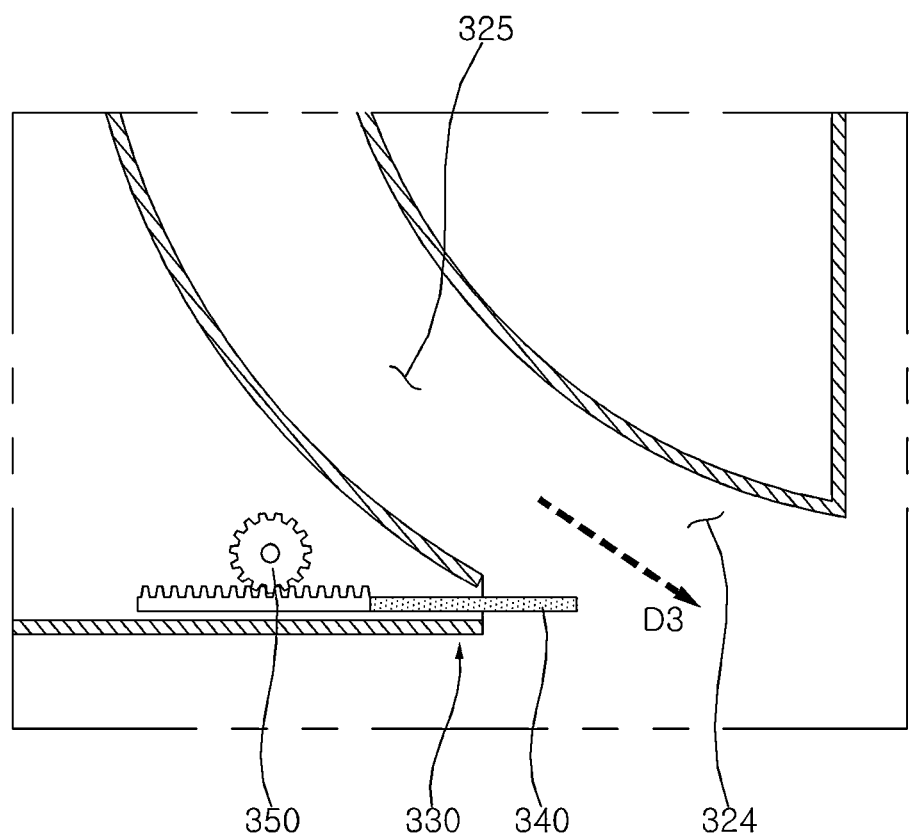

Referring to FIGS. 17A to 17C, by varying the protruding length of the vane 340 that protrudes into the outlet 324, the airflow direction control unit 330 may control the airflow direction of the air flowing through the outlet 324. Referring to FIG. 17A, the airflow direction control unit 330 may be disposed in a first position P1 in which the vane 340 protrudes into the outlet 324 to a maximum length. When the airflow direction control unit 330 is disposed in the first position P1, the vane 340 may protrude to a maximum allowable length. Accordingly, when the airflow direction control unit 330 is disposed in the first position P1, the air flowing through the outlet 335 may be guided in a direction horizontal to the ground. When the airflow direction control unit 330 is disposed in the first position P1, the vane 340 is arranged below outer end 324*b* of the outlet 324, such that the air discharged through the outlet 324 may flow along the vane 340 in the direction horizontal to the ground.

Referring to FIG. 17B, the airflow direction control unit 330 may be disposed in a second position P2 in which the vane 230 does not protrude into the outlet 324. When the airflow direction control unit 330 is disposed in the second position P2, the vane 230 may be disposed so as not to be exposed to the outlet 324. Accordingly, when the airflow direction control unit 330 is disposed in the second position P2, the air flowing through the discharge passage 335 may be discharged through the outlet 324 in a direction approximately perpendicular to the ground. However, depending on a shape of the discharge passage 335, a portion of the air flowing through the outlet 324 may also flow diagonally to the ground.

Referring to FIG. 17C, the airflow direction control unit 330 may be disposed in a third position P3 in which the vane 340 protrudes to a length shorter than the protruding length of the vane 340 when the airflow direction control unit 330 is disposed in the first position P1. When the airflow direction control unit 330 is disposed in the third position P3, the vane 340 may protrude into a length longer than the protruding length of the vane 340 that protrudes to the outlet 324 when the airflow direction control unit 330 is disposed in the second position P2. When the airflow direction control unit 330 is disposed in the third position P3, the vane 340 may protrude to a length which is ⅓ to ⅔ of the protruding length of the vane 340 that protrudes to the outlet 324 when the airflow direction control unit 330 is disposed in the second position P2.

When the airflow direction control unit 330 is disposed in the first position P1, an indirect airflow may be formed so that the air discharged through the outlet may flow in a direction horizontal to the ground. When the airflow direction control unit 330 is disposed in the second position P2, a vertical airflow may be formed so that the air discharged through the outlet may flow in a direction perpendicular to the ground. When the airflow direction control unit 330 is disposed in the third position P3, a diagonal airflow may be formed so that the air discharged through the outlet may flow in a direction between the indirect airflow and the vertical airflow.

As illustrated in FIGS. 5A and 5B, the air conditioner according to this embodiment may also cause the air discharged through the outlet 324 to flow in the first direction D1, the second direction D2, and the third direction D3 according to the first position P1, the second position P2, and the third position P3 of the airflow direction control unit 330.

Figure 18:
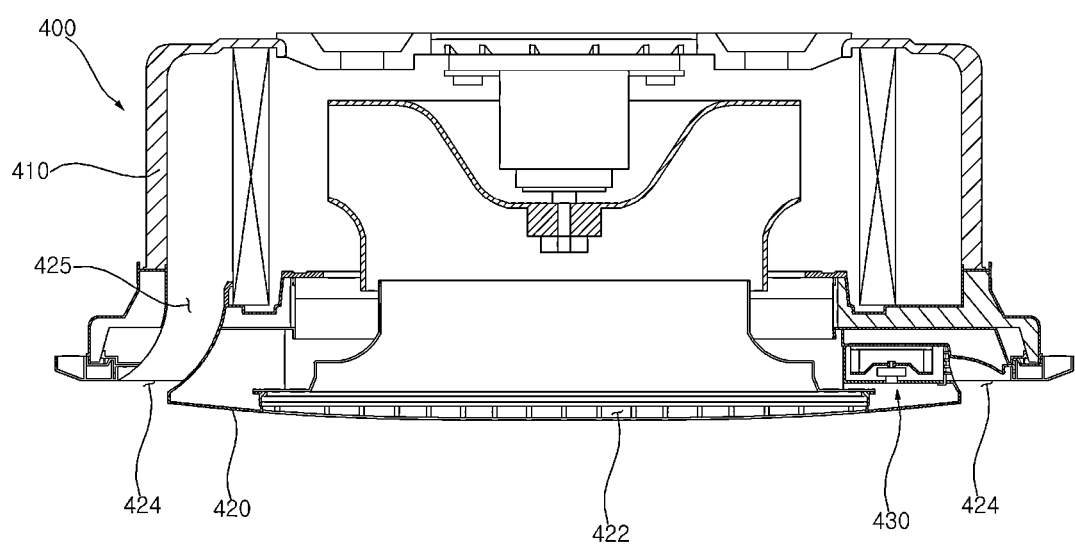
FIG. 18 is a cross-sectional view of one side of an air conditioner according to still another embodiment.

Hereinafter, an air conditioner according to yet another embodiment will be described with reference to FIGS. 18 to 19C. Air conditioner 400 according to this embodiment is different from the air conditioner 100 according to the embodiment of FIG. 1 in terms of a configuration of the air conditioner 100 and the airflow direction control unit according to the embodiment of FIG. 1. In the air conditioner according to this embodiment, an inlet 422 has a circular shape, and an outlet 424 is formed in an annular shape around the inlet 422.

An airflow direction control unit 430 of the air conditioner according to this embodiment may include an airflow direction control fan 440 disposed on one side of the outlet 424. The airflow direction control unit 430 may include a motor 450 that rotates the airflow direction control fan 400. The airflow direction control fan 440 may be disposed on one side in a direction where the inlet 422 is disposed and in a region where the outlet 424 is formed, and may adjust an airflow direction of air discharged through the outlet 424. The airflow direction control fan 440 may be disposed on one side of the outlet 424 to adjust an airflow direction of air discharged through the outlet 424. A plurality of airflow direction control fans 440 may be formed in an annular circumferential direction where the outlet 424 is formed.

The airflow direction control fan 440 may draw in ambient air around the outlet 424 to change pressure, thereby adjusting the airflow direction of the air flowing to the outlet 424. The airflow direction control fan 440 may control an amount of the drawn ambient air around the outlet 424.

By regulating a rotational speed of the airflow direction control fan 440 or by stopping the airflow direction control fan 440, the airflow direction control unit 430 may control the airflow direction of the air discharged through the outlet 424. When the airflow direction control fan 440 stops, the air flowing to the outlet 424 is affected by a shape of the discharge passage 425 and an opening direction of the outlet 424. Accordingly, when the airflow direction control fan 440 stops, the air flowing through the outlet 424 may be discharged in a direction perpendicular to the ground.

However, when the airflow direction control fan 440 is operated, a portion of the air discharged through the outlet 242 is affected by the airflow direction control fan 440, such that the air discharged through the outlet 424 may flow diagonally in a direction horizontal to the ground. In this case, the air flowing to the outlet 424 may be controlled based on the amount of air drawn by the airflow direction control fan 440. When the rotational speed of the airflow direction control fan 440 increases, the amount of air drawn by the airflow direction control fan 440 increases, thereby causing the air to flow in a direction parallel to the ground.

Figure 19A:
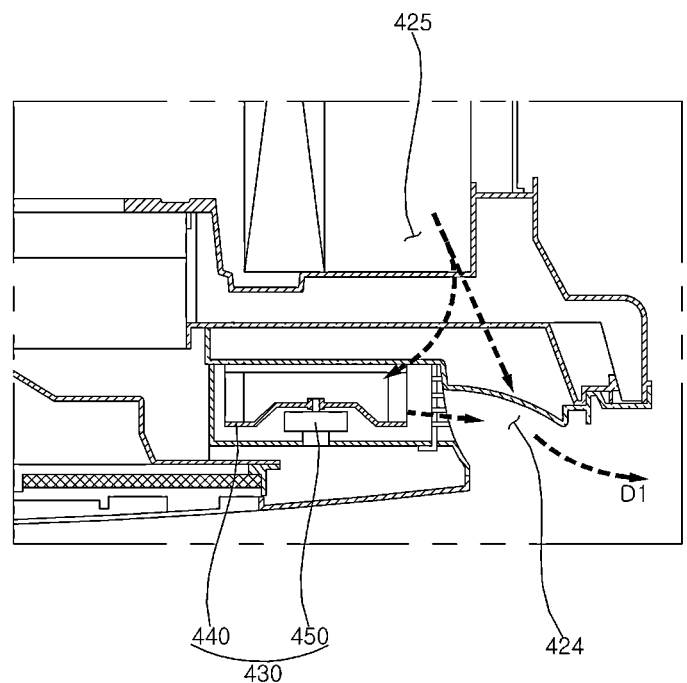
FIGS. 19A to 19C are diagrams explaining an airflow at each rotational speed of an airflow direction control unit according to the embodiment of FIG. 18.
Figure 19B:
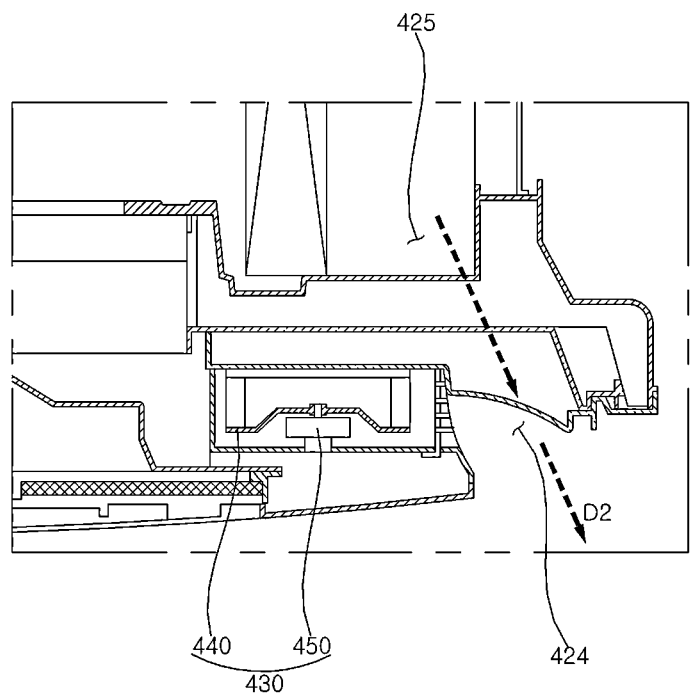
Figure 19C:
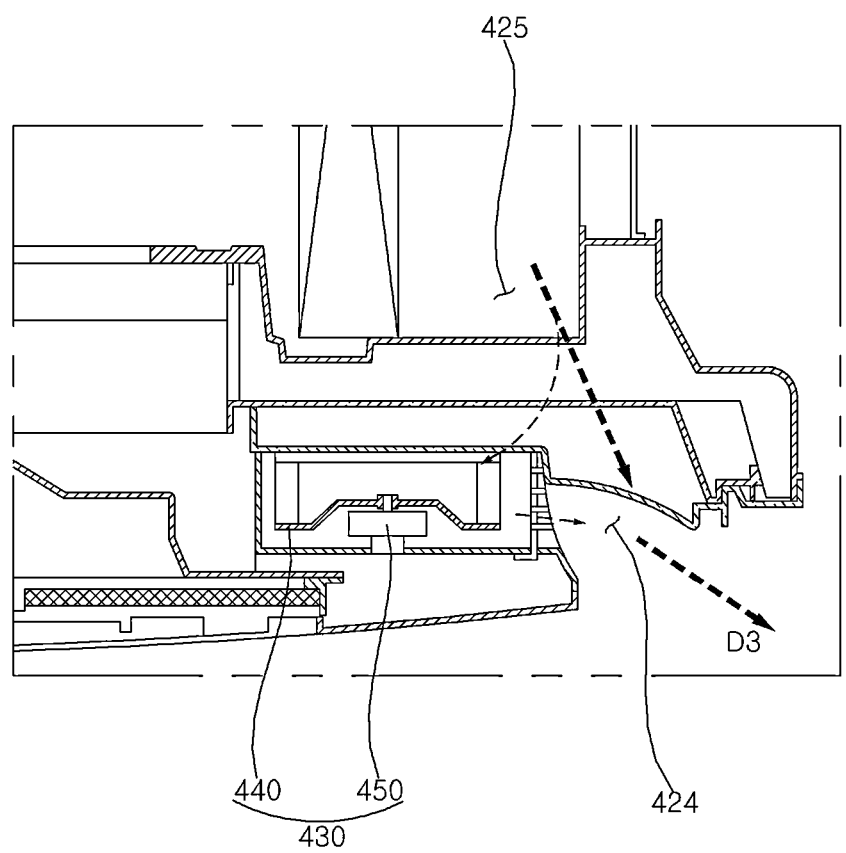

Referring to FIGS. 19A to 19C, the airflow direction control unit 430 may control the airflow direction of the air discharged through the outlet 424 by controlling the operation or rotational speed of the airflow direction control fan 440. Referring to FIG. 19A, the airflow direction control unit 430 may rotate at a first setting speed for rotating the airflow direction control fan 440 at a maximum rotational speed. By rotating at the first setting speed, the airflow direction control unit 430 may generate an indirect airflow for causing the air discharged through the outlet to flow in a direction horizontal to the ground.

Referring to FIG. 19B, the airflow direction control unit 430 may rotate at a second setting speed for rotating the airflow direction control fan 440 at a minimum rotational speed or stopping the airflow direction control fan 440. The second setting speed corresponds to a speed including a "zero" speed. Accordingly, the second setting speed of the airflow direction control unit 430 may include a state in which the airflow direction control fan 440 stops. By rotating at the second setting speed, the airflow direction control unit 430 may generate a vertical airflow for causing the air discharged through the outlet to flow in a direction perpendicular to the ground.

Referring to FIG. 19C, the airflow direction control unit 430 may rotate at a third setting speed for rotating the airflow direction control fan 440 at a rotational speed ranging between the first setting speed and the second setting speed. By rotating at the third setting speed, the airflow direction control unit 430 may generate a diagonal airflow for causing the air discharged through the outlet to flow in a direction between the indirect airflow and the vertical airflow.

By rotating at the first rotational speed which is the maximum speed, the airflow direction control unit 430 may generate an indirect airflow for causing the air discharged through the outlet to flow in a direction horizontal to the ground. By rotating at the second rotational speed for rotation at the minimum speed or stopping, the airflow direction control unit 330 may generate a vertical airflow for causing the air discharged through the outlet to flow in a direction perpendicular to the ground. By rotating at the third rotational speed corresponding to a speed between the first rotational speed and the second rotational speed, the airflow direction control unit 430 may generate a diagonal airflow for causing the air discharged through the outlet in a direction between the indirect airflow and the vertical airflow.

As illustrated in FIGS. 5A and 5B, the air conditioner according to this embodiment may also cause the air discharged through the outlet 324 to flow in the first direction D1, the second direction D2, and the third direction D3 according to the first position P1, the second position P2, and the third position P3 of the airflow direction control unit 330.

The method for operating an air conditioner according to the embodiments of FIGS. 9 and 10 may be applied to the air conditioner according to embodiments disclosed herein.

Embodiments disclosed herein solve the above and other problems.

Embodiments disclosed herein provide an air conditioner capable of accurately determining an occupant's activity level, and a method for operating an air conditioner. Embodiments disclosed herein further provide an air conditioner capable of providing an optimal airflow for an occupant based on a position and an activity level of the occupant, and a method for operating an air conditioner. Embodiments disclosed herein furthermore provide an air conditioner capable of controlling a temperature of an indoor space appropriately based on an activity level of an occupant, and a method for operating an air conditioner.

Advantages are not limited to the aforementioned advantages and other advantages not described herein will be clearly understood by those skilled in the art from the following description.

Embodiments disclosed herein provide an air conditioner that may include a plurality of outlets which open downwardly; a plurality of airflow direction control units (airflow direction controllers) disposed at the respective outlets; and a camera disposed to be directed toward an indoor space. A controller may determine an activity level of an occupant for each of a plurality of areas of the indoor space based on a plurality of images corresponding to the indoor space; determine a direction of air discharged from the respective outlets based on the determined activity level; and control the airflow direction control unit according to the direction of the air which is determined for the respective outlets.

According to an embodiment, among the plurality of areas, if an activity level for a first area is greater than a predetermined level and an activity level for a second area is less than the predetermined level, the controller may control the airflow direction control unit so that a direction of air discharged from a first outlet corresponding to the first area is different from a direction of air discharged from a second outlet corresponding to the second area in the upward and downward direction. During a cooling operation, the controller may control the airflow direction control unit so that the direction of the air discharged from the first outlet may be vertically below the direction of the air discharged from the second outlet, and during a heating operation, the controller may control the airflow direction control unit so that the direction of the air discharged from the first outlet is vertically above the direction of the air discharged from the second outlet. Among the plurality of areas, if an activity level corresponding to a third area satisfies a criterion associated with the predetermined level, the controller may control the airflow direction control unit so that a direction of air discharged from a third outlet corresponding to the third area may change continuously between the direction of the air discharged from the first outlet and the direction of the air discharged from the second outlet.

According to an embodiment, the air conditioner may further include a temperature sensor configured to sense a temperature of the indoor space. The controller may set a target temperature based on a result of comparison between a predetermined reference and a sum of activity levels of the occupant which are determined for each of the plurality of areas, and may control the temperature of the indoor space based on a difference between a current temperature of the indoor space, which is sensed by the temperature sensor, and the target temperature.

The controller may calculate a motion vector for a plurality of pixels constituting the occupant and included in the plurality of images using a dense optical flow method, and may determine the activity level of the occupant based on the calculated motion vector. The controller may determine, as the activity level of the occupant, a value obtained by dividing a sum of magnitudes of motion vectors for the plurality of pixels, which are calculated for the plurality of images, by a number of the pixels.

According to an embodiment, the airflow direction control unit may include a plurality of vanes disposed at the respective outlets. By adjusting an arrangement of each of the vanes, the controller may change the direction of the air discharged from the respective outlets.

The airflow direction control unit may include a plurality of airflow direction control fans, each disposed on one side of the respective outlets, wherein by regulating a rotational speed of the plurality of airflow direction control fans, the controller may change the direction of the air discharged from the respective outlets.

Embodiments disclosed herein provide a method for operating an air conditioner that may include determining an activity level of an occupant for each of a plurality of areas of an indoor space based on a plurality of images corresponding to the indoor space and captured by a camera of the air conditioner; determining a direction of air discharged from the respective outlets based on the determined activity level; and according to the direction of the air which is determined for the respective outlets, controlling an airflow direction control unit configured to control an airflow direction of air flowing through the respective outlets in an upward and downward direction. The controlling of the airflow direction control unit may include a first operation of controlling the airflow direction control unit in which, among the plurality of areas, if an activity level for a first area is greater than a predetermined level and an activity level for a second area is less than the predetermined level, the airflow direction control unit is controlled so that a direction of air discharged from a first outlet corresponding to the first area is different from a direction of air discharged from a second outlet corresponding to the second area in the upward and downward direction.

The first operation of controlling the airflow direction control unit may include a second operation of controlling the airflow direction control unit in which, during a cooling operation, the airflow direction control unit is controlled so that the direction of the air discharged from the first outlet is vertically below the direction of the air discharged from the second outlet; and a third operation of controlling the airflow direction control unit in which, during a heating operation, the airflow direction control unit is controlled so that the direction of the air discharged from the first outlet is vertically above the direction of the air discharged from the second outlet. The controlling of the airflow direction control unit may include, among the plurality of areas, if an activity level corresponding to a third area satisfies a criterion associated with the predetermined level, controlling the airflow direction control unit so that a direction of air discharged from a third outlet corresponding to the third area may change continuously between the direction of the air discharged from the first outlet and the direction of the air discharged from the second outlet.

According to an embodiment, the method for operating an air conditioner may further include setting a target temperature based on a result of comparison between a predetermined reference and a sum of activity levels of the occupant which are determined for each of the plurality of areas, and controlling temperature of an indoor space based on a difference between a current temperature of the indoor space, which is sensed by a temperature sensor that senses the temperature of the indoor space, and the target temperature. The determining of the activity level of the occupant may include using a dense optical flow method, calculating a motion vector for a plurality of pixels constituting the occupant and included in the plurality of images, and determining the activity level of the occupant based on the calculated motion vector. The determining of the activity level of the occupant based on the calculated motion vector may include determining, as the activity level of the occupant, a value obtained by dividing a sum of magnitudes of motion vectors for the plurality of pixels, which are calculated for the plurality of images, by a number of the pixels.

According to an embodiment, the airflow direction control unit may include a plurality of vanes disposed at the respective outlets. The controlling of the airflow direction control unit may include changing the direction of the air discharged from the respective outlets by adjusting an arrangement of each of the vanes.

According to an embodiment, the airflow direction control unit may include a plurality of airflow direction control fans, each disposed on one side of the respective outlets. The controlling of the airflow direction control unit may include changing a direction of the air discharged from the respective outlets by regulating a rotational speed of the plurality of airflow direction control fans. A distance between the third area and the air conditioner may be longer than at least one of a distance between the first area and the air conditioner and a distance between the second area and the air conditioner.

Embodiments disclosed herein have one or more of the following advantages.

First, based on a result of processing pixels included in images of an indoor space, an activity level of an occupant may be determined accurately. Second, by determining a position and activity level of an occupant for each of a plurality of areas of an indoor space, a direction of air supplied to respective areas may be adjusted to various airflow directions, thereby providing an optimal airflow for the occupant. Third, by comprehensively determining activity levels of all the occupants present in the indoor space, a target temperature optimized for the occupants may be set, such that the temperature of the indoor space may be controlled appropriately.

Embodiments are not limited to the aforesaid, and other effects not described herein will be clearly understood by those skilled in the art from the description of the appended claims.

The attached drawings are provided to help easy understanding of the embodiments, not limiting the scope and spirit. Thus, it is to be understood that embodiments cover all modifications, equivalents, and/or alternatives falling within the scope and spirit.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing are advantageous.

While embodiments have been particularly shown and described with reference to embodiments thereof, it will be understood by those skilled in the art that embodiments are not limited to those exemplary embodiments and various changes in form and details may be made therein without departing from the scope and spirit as defined by the appended claims and should not be individually understood from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
    a case having a space formed therein and an open bottom;
    a panel disposed under the case and having an inlet and a plurality of outlets disposed around a circumference of the inlet;
    a fan disposed in the case and configured to generate an airflow from the inlet to the plurality of outlets;
    an airflow direction controller disposed at the plurality of outlets and configured to control an airflow direction of air flowing through the plurality of outlets in a plurality of directions;
    a camera disposed at one side of the panel and directed toward an indoor space; and
    a controller configured to control the airflow direction controller based on images corresponding to the indoor space and captured by the camera, wherein the controller is configured to:
        calculate a motion vector for a plurality of pixels constituting an occupant and included in the plurality of images;
        determine an activity level of the occupant for each of a plurality of areas of the indoor space;
        determine a direction of air discharged from the plurality of outlets based on the determined activity level; and
        control the airflow direction controller according to the direction of the air which is determined for the plurality of outlets, wherein the activity level of the occupant is determined based on a value obtained by dividing a sum of magnitudes of motion vectors for the plurality of pixels, which are calculated for the plurality of images, by a number of the pixels.

2. The air conditioner of claim 1, wherein among the plurality of areas, based on an activity level for a first area being greater than a predetermined level and an activity level for a second area being less than the predetermined level, the controller is configured to control the airflow direction controller so that a direction of air discharged from a first outlet corresponding to the first area is different from a direction of air discharged from a second outlet corresponding to the second area.

3. The air conditioner of claim 2, wherein the controller is configured to:
    during a cooling operation, control the airflow direction controller so that the direction of the air discharged from the first outlet is vertically below the direction of the air discharged from the second outlet; and during a heating operation, control the airflow direction controller so that the direction of the air discharged from the first outlet is vertically above the direction of the air discharged from the second outlet.

4. The air conditioner of claim 2, wherein among the plurality of areas, based on an activity level corresponding to a third area satisfying a criterion associated with the predetermined level, the controller is configured to control the airflow direction controller so that a direction of air discharged from a third outlet corresponding to the third area changes continuously between the direction of the air discharged from the first outlet and the direction of the air discharged from the second outlet.

5. The air conditioner of claim 4, wherein a distance between the third area and the air conditioner is longer than at least one of a distance between the first area and the air conditioner or a distance between the second area and the air conditioner.

6. The air conditioner of claim 1, further comprising a temperature sensor configured to sense a temperature of the indoor space, wherein the controller is configured to:
set a target temperature based on a result of a comparison between a predetermined reference and a sum of activity levels of the occupant which are determined for each of the plurality of areas; and
control the temperature of the indoor space based on a difference between a current temperature of the indoor space, which is sensed by the temperature sensor, and the target temperature.

7. The air conditioner of claim 1, wherein the motion vector is calculated using an optical flow method.

8. The air conditioner of claim 1, wherein the airflow direction controller comprises a plurality of vanes disposed at the plurality of outlets, respectively, and wherein the controller is configured to change the direction of the air discharged from the plurality of outlets by adjusting an arrangement of each of the plurality of vanes.

9. The air conditioner of claim 1, wherein the airflow direction controller comprises a plurality of airflow direction control fans, each disposed on one side of the plurality of outlets, respectively, and wherein the controller is configured to change the direction of the air discharged from the plurality of outlets, respectively, by regulating a rotational speed of the plurality of airflow direction control fans.

10. A method for operating an air conditioner having an inlet and a plurality of outlets disposed around a circumference of the inlet, the method comprising:
determining, via a controller, an activity level of an occupant for each of a plurality of areas of an indoor space based on a plurality of images corresponding to the indoor space and captured by a camera of the air conditioner;
determining, via the controller, a direction of air discharged from the plurality of outlets based on the determined activity level; and
according to the direction of the air which is determined for the plurality of outlets, controlling an airflow direction controller configured to control an airflow direction of air flowing through the plurality of outlets, wherein the determining of the activity level of the occupant comprises calculating, via a controller, a motion vector for the plurality of pixels constituting the occupant and included in the plurality of images, and wherein the activity level of the occupant is determined based on a value obtained by dividing a sum of magnitudes of motion vectors for the plurality of pixels, which are calculated for the plurality of images, by a number of the pixels.

11. The method of claim 10, wherein the controlling of the airflow direction controller comprises, among the plurality of areas, based on an activity level for a first area being greater than a predetermined level and an activity level for a second area being less than the predetermined level, controlling the airflow direction controller so that a direction of air discharged from a first outlet corresponding to the first area is different from a direction of air discharged from a second outlet corresponding to the second area.

12. The method of claim 11, wherein the controlling of the airflow direction controller comprises:
during a cooling operation, controlling the airflow direction controller so that the direction of the air discharged from the first outlet is vertically below the direction of the air discharged from the second outlet; and
during a heating operation, controlling the airflow direction controller so that the direction of the air discharged from the first outlet is vertically above the direction of the air discharged from the second outlet.

13. The method of claim 11, wherein the controlling of the airflow direction controller further comprises, among the plurality of areas, based on an activity level corresponding to a third area satisfying a criterion associated with the predetermined level, controlling the airflow direction controller so that a direction of air discharged from a third outlet corresponding to the third area changes continuously between the direction of the air discharged from the first outlet and the direction of the air discharged from the second outlet.

14. The method of claim 13, wherein a distance between the third area and the air conditioner is longer than at least one of a distance between the first area and the air conditioner or a distance between the second area and the air conditioner.

15. The method of claim 10, further comprising:
setting a target temperature based on a result of comparison between a predetermined reference and a sum of activity levels of the occupant which are determined for each of the plurality of areas; and
controlling a temperature of an indoor space based on a difference between a current temperature of the indoor space, which is sensed by a temperature sensor that senses the temperature of the indoor space, and the target temperature.

16. The method of claim 10, wherein the determining of the activity level of the occupant comprises: calculating a motion vector using an optical flow method.

17. The method of claim 10, wherein the airflow direction controller comprises a plurality of vanes disposed at the plurality of outlets, respectively, and wherein the controlling of the airflow direction controller comprises changing the direction of the air discharged from the plurality of outlets by adjusting an arrangement of each of the vanes.

18. The method of claim 10, wherein the airflow direction controller comprises a plurality of airflow direction control fans, each disposed at one side of the plurality of outlets, respectively, wherein the controlling of the airflow direction controller comprises changing the direction of the air discharged from the plurality of outlets by regulating a rotational speed of the plurality of airflow direction control fans.

* * * * *